United States Patent
Yang

(10) Patent No.: US 10,748,240 B2
(45) Date of Patent: *Aug. 18, 2020

(54) TILING A PRIMITIVE IN A GRAPHICS PROCESSING SYSTEM BY EDGE-SPECIFIC TESTING OF A SUBSET OF TILES IN A RENDERING SPACE

(71) Applicant: Imagination Technologies Limited, Kings Langley (GB)

(72) Inventor: Xile Yang, Rickmansworth (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/667,691

(22) Filed: Oct. 29, 2019

(65) Prior Publication Data
US 2020/0065935 A1   Feb. 27, 2020

Related U.S. Application Data

(63) Continuation of application No. 16/366,762, filed on Mar. 27, 2019, now Pat. No. 10,497,088, which is a (Continued)

(30) Foreign Application Priority Data

Apr. 22, 2015 (GB) .................................. 1506865.3

(51) Int. Cl.
*G06F 13/14* (2006.01)
*G06T 1/20* (2006.01)
(Continued)

(52) U.S. Cl.
CPC .................. *G06T 1/20* (2013.01); *G06T 1/60* (2013.01); *G06T 11/40* (2013.01); *G06T 15/005* (2013.01); *G06T 2200/04* (2013.01)

(58) Field of Classification Search
CPC .......... G06F 3/14; G09G 5/363; G09G 5/006; G09G 5/001; G06T 1/20
(Continued)

(56) References Cited

U.S. PATENT DOCUMENTS 6,437,780 B1 * 8/2002 Baltaretu ................ G06T 11/40
345/423
9,633,458 B2 * 4/2017 Steiner .................... G06T 11/40
(Continued)

*Primary Examiner* — Gordon G Liu
(74) *Attorney, Agent, or Firm* — Potomac Law Group, PLLC; Vincent M DeLuca

(57) ABSTRACT

In tile-based graphics processing systems, a tiling unit determines which tiles of a rendering space a primitive is in, such that the primitives in a tile can be rendered. Rather than performing tiling calculations for each tile in a bounding box for a primitive, tiling tests can be performed for a subset of the tiles. Then the results of the tiling tests for the subset of tiles can be used to determine whether the primitive is in other tiles which are located within a region bounded by two or more of the tiles of the subset. In this way the tiling process can be implemented without performing tiling calculations for all of the tiles in the bounding box for a primitive. Reducing the number of tiling calculations can help to improve the efficiency of the graphics processing system (in terms of speed and power consumption) for rendering a primitive.

20 Claims, 12 Drawing Sheets

Related U.S. Application Data continuation of application No. 15/135,751, filed on Apr. 22, 2016, now Pat. No. 10,282,807.

(51) Int. Cl.
*G06T 11/40* (2006.01)
*G06T 15/00* (2011.01)
*G06T 1/60* (2006.01)

(58) Field of Classification Search
USPC .......................................................... 345/520
See application file for complete search history.

(56) References Cited

U.S. PATENT DOCUMENTS

| | | | |
|---|---|---|---|
| 2009/0147016 A1 | 6/2009 | Barone et al. | |
| 2011/0090251 A1* | 4/2011 | Donovan | G06T 15/005 |
| | | | 345/632 |
| 2012/0147007 A1* | 6/2012 | Woo | G06T 15/00 |
| | | | 345/426 |

\* cited by examiner

TILING A PRIMITIVE IN A GRAPHICS PROCESSING SYSTEM BY EDGE-SPECIFIC TESTING OF A SUBSET OF TILES IN A RENDERING SPACE

BACKGROUND

Graphics processing systems are used to process graphics data. For example, an application running on a computing system may need to render an image of a three dimensional (3D) scene for display to a user. The application can send graphics data to a graphics processing system to be rendered, wherein the graphics data describes a plurality of primitives to be rendered. As is known in the art, primitives are usually convex polygons, such as triangles or convex quadrilaterals, wherein a primitive typically has its position in the rendering space of the graphics processing system defined by the position of its vertices, and may have its appearance defined by other attributes such as colour or texture attributes. An object in a scene may be represented by one or more primitives. As graphics processing systems progress, their capability to render complex images improves, and as such applications make use of this and provide more complex images for graphics processing systems to render. This means that the number of primitives in images tends to increase, so the ability of a graphics processing system to process the primitives efficiently becomes more important.

One known way of improving the efficiency of a graphics processing system is to render an image in a tile-based manner. In this way, the rendering space into which primitives are to be rendered is divided into a plurality of tiles, which can then be rendered independently from each other. In order to render primitives, a rendering unit uses memory to store intermediate results (e.g. depth values and primitive identifiers, etc.) for different sample positions in the rendering space. If the rendering unit operates on a tile at a time then most (or all) of this memory can be situated "on-chip", i.e. on the Graphics Processing Unit (GPU), which might not be possible if the whole rendering space is rendered at once. Therefore, in a tile-based graphics system, the number of read and write operations between the GPU and an off-chip memory (i.e. which may be referred to as "system memory") is typically reduced compared to a non tile-based graphics system. Since read and write operations between the GPU and the system memory are typically very slow and use a large amount of power (as compared to operations performed within the GPU), tile-based graphics systems are often more efficient (in terms of power and speed) than non tile-based graphics systems. A tile-based graphics system includes a tiling unit to tile the primitives. That is, the tiling unit determines, for a primitive, which of a plurality of tiles of a rendering space the primitive is in. Then, when a rendering unit renders the tile, it can be given information indicating which primitives should be used to render that tile.

For example, FIG. 1 shows some elements of a tile-based graphics processing system 100 which may be used to render an image of a 3D scene. The graphics processing system 100 comprises a graphics processing unit (GPU) 102 and two portions of memory $104_1$ and $104_2$. It is noted that the two portions of memory $104_1$ and $104_2$ may, or may not, be parts of the same physical memory, and both memories $104_1$ and $104_2$ may be situated "off-chip", i.e. not on the same chip as the GPU 102. Communication between the memories ($104_1$ and $104_2$) and the GPU 102 may take place over a communications bus in the system 100.

The GPU 102 comprises a pre-processing module 106, a tiling unit 108 and a rendering unit 110. The tiling unit 108 comprises processing logic 112 and a data store 114, and the rendering unit 110 comprises a hidden surface removal (HSR) module 116 and a texturing/shading module 118. The graphics processing system 100 is arranged such that graphics data describing a sequence of primitives provided by an application is received at the pre-processing module 106. The pre-processing module 106 performs functions such as geometry processing including clipping and culling to remove primitives which do not fall into a visible view. The pre-processing module 106 may also project the primitives into screen-space. The pre-processing module 106 outputs primitives to the tiling unit 108.

The tiling unit 108 receives the primitives from the pre-processing module 106 and determines which of the primitives are present within each of the tiles of the rendering space of the graphics processing system 100. A primitive may be completely in one tile or may overlap two or more of the tiles of the rendering space. The tiling unit 108 assigns primitives to tiles of the rendering space by creating display lists for the tiles, wherein the display list for a tile includes indications of primitives (i.e. primitive IDs) which are present in the tile. The display lists and the primitives are outputted from the tiling unit 108 and stored in the memory $104_1$. The rendering unit 110 fetches the display list for a tile and the primitives relevant to that tile from the memory $104_1$, and the HSR module 116 performs hidden surface removal to thereby remove fragments of primitives which are hidden in the scene. The remaining fragments are passed to the texturing/shading module 118 which performs texturing and/or shading on the fragments to determine pixel colour values of a rendered image which can be passed to the memory $104_2$ for storage in a frame buffer. The rendering unit 110 processes primitives in each of the tiles and when the whole image has been rendered and stored in the memory $104_2$, the image can be outputted from the graphics processing system 100 and, for example, displayed on a display. In the example shown in FIG. 1, the tile-based graphics processing system 100 is a deferred rendering system, meaning that the rendering unit 110 performs hidden surface removal on a primitive fragment prior to performing texturing and/or shading on the primitive fragment in order to render the scene. However, in other examples, graphics processing systems might not be deferred rendering systems, such that texturing and/or shading is performed on a primitive fragment before hidden surface removal is performed on the primitive.

FIG. 2 shows an example of a rendering space 202 which has been divided into an 8×12 array of tiles 204, wherein the tile in the $m^{th}$ row and the $n^{th}$ column is referred to as $204_{mn}$. A primitive 206 is illustrated. The tiling unit 108 operates to determine which of the tiles $204_{mn}$ the primitive 206 is in. The primitive 206 is "in" a tile $204_{mn}$ if the primitive 206 at least partially overlaps with the tile. The tiling unit 108 determines a bounding box 208 by finding the minimum and maximum x and y coordinates of the three vertices of the primitive 206 and forming the box 208 from those coordinates. The tiling unit 108 can thereby determine that the primitive 206 is not in any of the tiles $204_{mn}$ which are not in the bounding box 208. A tile 204 is "in" the bounding box 208 if the tile at least partially overlaps with the bounding box 208. In some examples, the bounding box may be determined at tile-resolution, whereby the bounding box may be increased in size such that the edges of the bounding box fall on tile boundaries. In FIG. 2, the tiles which are dotted (i.e. the top and bottom rows of tiles, the first column and the last two columns of tiles of the rendering space 202) are outside of the bounding box 208 and therefore, on that basis, the tiling unit 108 can determine that the primitive 206 is not in those tiles. In a very simple implementation, the tiling unit 108 might simply indicate that the primitive is in all of the tiles in the bounding box 208. However, this means that the primitive is indicated as being in some tiles which it is not actually in. This can lead to additional memory consumption due to the storage of unnecessary primitives and/or primitive IDs in memory $104_1$, and inefficiencies in the rendering unit 110 as primitives are read from memory $104_1$ and are processed for tiles in which they are not visible. Therefore, it is generally preferable for the tiling unit 108 to determine which of the tiles in the bounding the box 208 the primitive is in.

For each tile in the bounding box 208 (e.g. each of the white tiles in FIG. 2) tiling calculations can be performed to determine whether the primitive 206 is in the tile. For example, the tiling calculations to determine whether the primitive 206 is in a tile $204_{mn}$ might include calculations for each edge of the primitive. For example, as illustrated in FIG. 3, equations representing edge lines ($302_1$, $302_2$ and $302_3$) defining the edges of the primitive 206 are determined using the locations of the vertices ($304_1$, $304_2$ and $304_3$) of the primitive 206. Then for each edge line 302, a test can be performed to determine whether a tile 204 is inside or outside the respective edge line 302 by comparing a position of a test point in the tile with the equation of the edge line 302. The test point in the tile may be different for testing with respect to different edges, i.e. the test point may be edge-specific. For example, for testing whether a tile is inside edge line $302_1$ the test point is in the bottom left of the tile; for testing whether a tile is inside edge line $302_2$ the test point is in the top left of the tile; and for testing whether a tile is inside edge line $302_3$ the test point is in the bottom right of the tile. If it is determined that the tile is inside all of the edge lines 302 then it is determined that the primitive is in the tile. However, if it is determined that the tile is outside any of the edge lines 302 then it is determined that the primitive is not in the tile.

The tiling calculations may be performed for each of the tiles in the bounding box 208 in order to determine whether the primitive is in the respective tiles. For each edge of the primitive, and for each tile in the bounding box, the comparison of the position of the edge-specific test point in the tile with the equation of the appropriate edge line typically involves performing one or more floating point operations. Floating point operations are costly to perform (in terms of time and power consumption). This may cause a problem, particularly due to the tendency for the number of primitives in an image to increase, because the number of floating point operations involved in the tiling process may become large enough to significantly detrimentally affect the performance of the graphics processing system 100. Therefore, it would generally be beneficial to reduce the time and power that is consumed in the tiling process.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There are described herein examples in which the number of tiling calculations (e.g. involving floating point operations) that are performed for tiling a primitive may be reduced compared to the prior art examples described in the background section above. This can help to improve the efficiency of the graphics processing system (e.g. in terms of speed and power) for rendering a primitive.

There is described herein a method of processing a primitive in a graphics processing system, the method comprising tiling the primitive to determine which of a plurality of tiles of a rendering space the primitive is in, said tiling the primitive comprising: for each tile of a subset of the tiles, performing a tiling test to determine whether the primitive is in the tile; and using results of the tiling tests for two or more of the tiles of the subset to determine whether the primitive is in at least one other tile which is located within a region bounded by said two or more of the tiles of the subset.

There is described herein a graphics processing system comprising a tiling unit for tiling a primitive to determine which of a plurality of tiles of a rendering space the primitive is in, the tiling unit being configured to: for each tile of a subset of the tiles, perform a tiling test to determine whether the primitive is in the tile; and use results of the tiling tests for two or more of the tiles of the subset to determine whether the primitive is in at least one other tile which is located within a region bounded by said two or more of the tiles of the subset.

There may be provided computer readable code adapted to perform the steps of the methods of any of the examples described herein when the code is run on a computer. Furthermore, there may be provided computer readable code for generating a graphics processing system according to any of the examples described herein. The computer readable code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
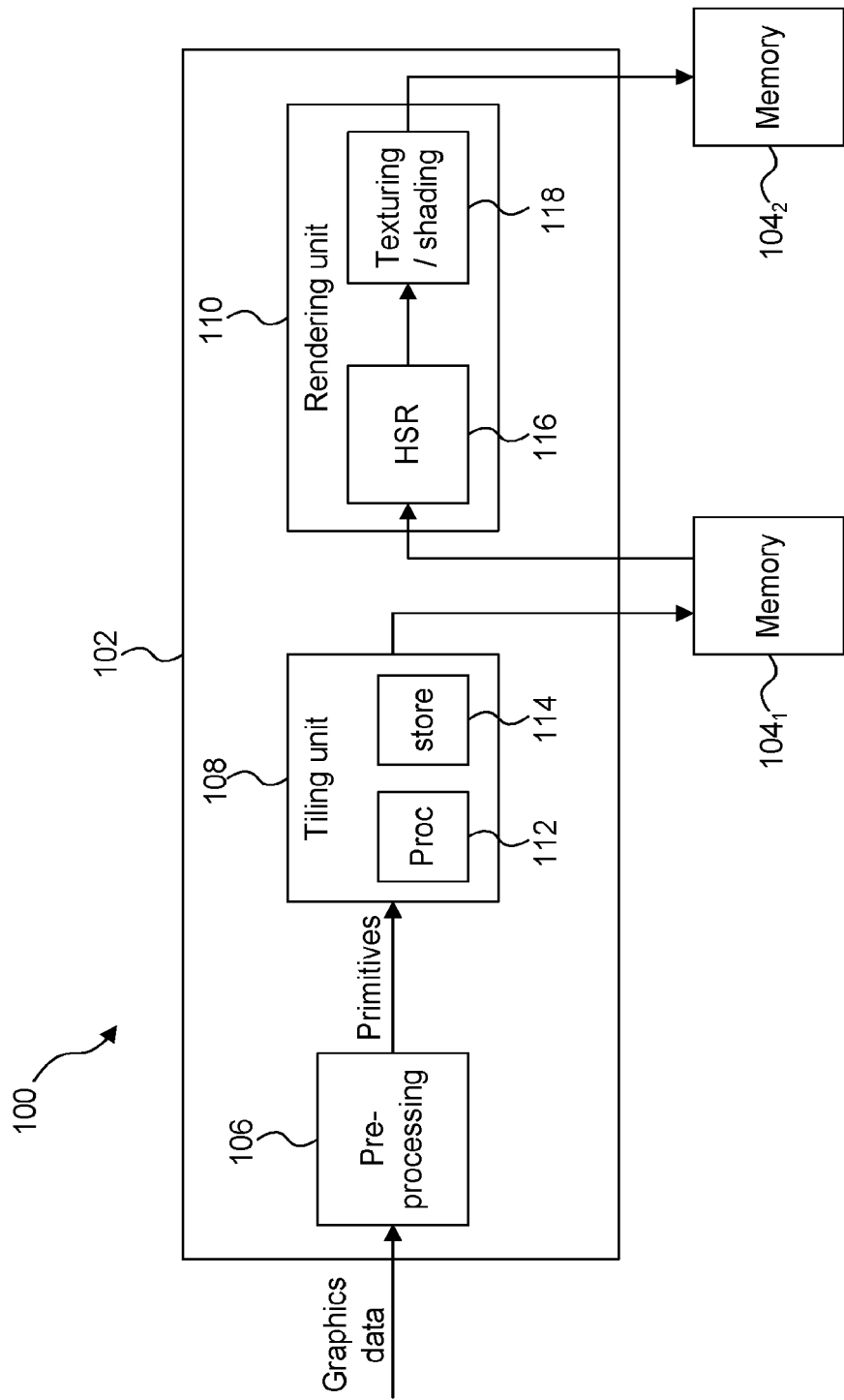
FIG. 1 is a schematic diagram of a graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

The graphics processing system 100 shown in FIG. 1 may be used to implement methods of the examples described herein. As described above, the graphics processing system 100 is a tile-based deferred rendering graphics processing system which includes a GPU 102 and two portions of memory $104_1$ and $104_2$. As mentioned above, the two portions of memory $104_1$ and $104_2$ may, or may not, be parts of the same physical memory, and both memories $104_1$ and $104_2$ may be situated "off-chip", i.e. not on the same chip as the GPU 102. Communication between the memories ($104_1$ and $104_2$) and the GPU 102 may take place over a communications bus in the system 100. The GPU 102 comprises a pre-processing module 106, a tiling unit 108 and a rendering unit 110. The tiling unit 108 comprises processing logic 112 and a data store 114, and the rendering unit 110 comprises a hidden surface removal (HSR) module 116 and a texturing/shading module 118.

In operation, the graphics processing system 100 receives graphics data (e.g. from an application) describing a sequence of primitives. The pre-processing module 106 performs functions such as geometry processing including clipping and culling to remove primitives which do not fall into a visible view. The pre-processing module 106 may also project the primitives into screen-space. The pre-processing module 106 outputs primitives to the tiling unit 108.

Figure 4A:
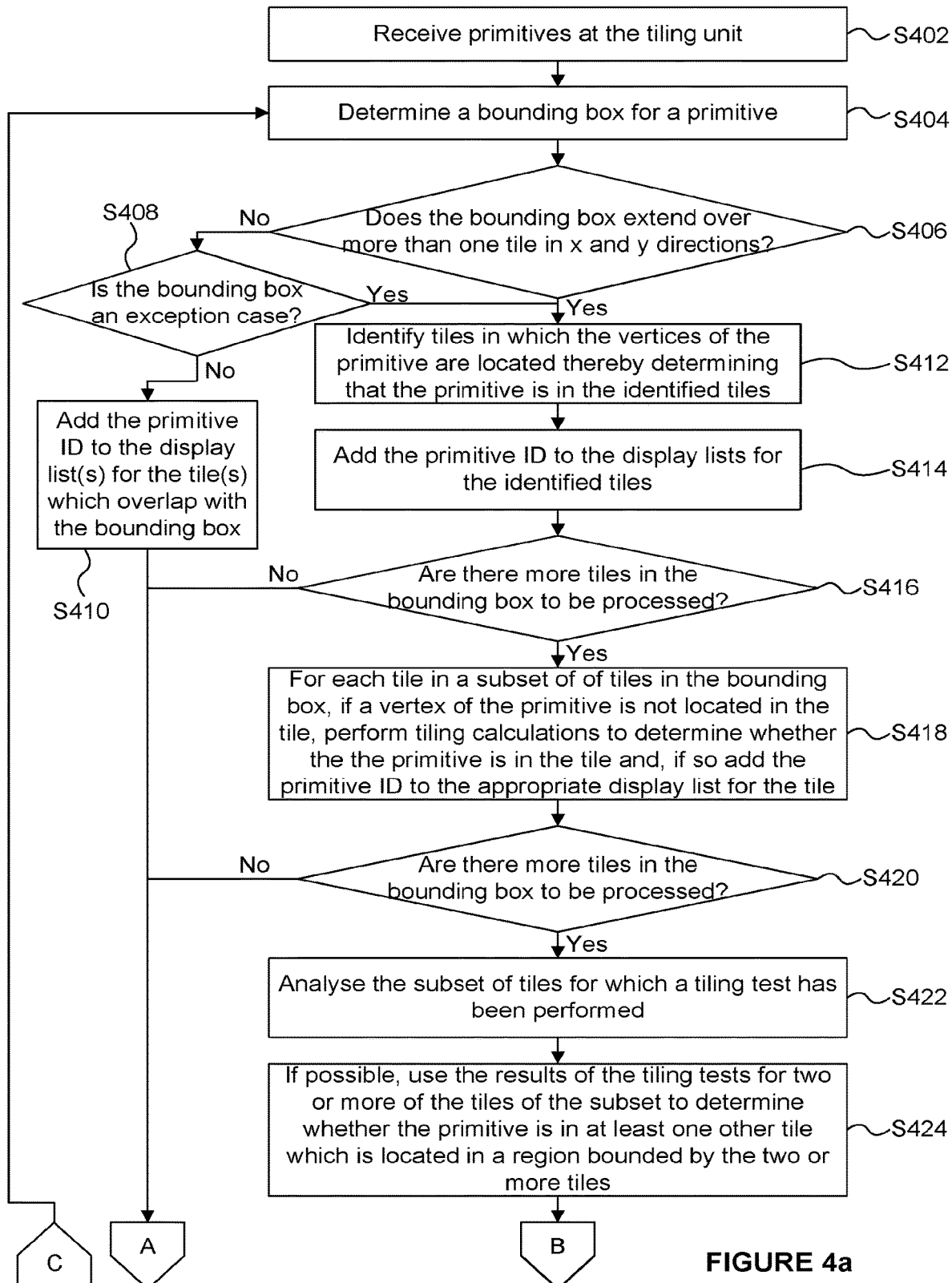
FIGS. 4a and 4b show a flow chart illustrating a first method of processing primitives in a graphics processing system.
Figure 4B:
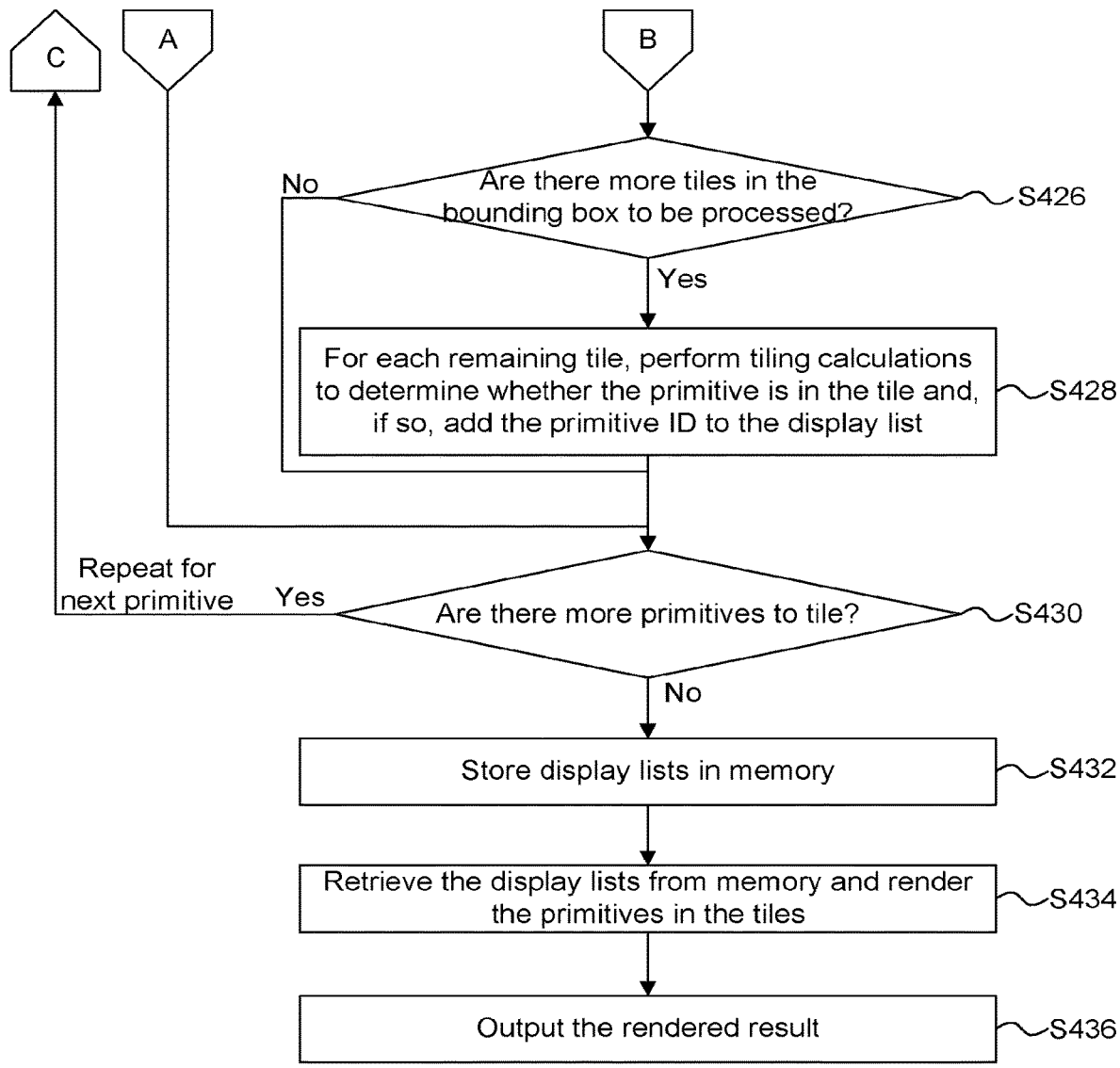

With reference to the flow chart shown in FIGS. 4a and 4b, an example of how the graphics processing system 100 can process primitives is described. Rather than performing tiling calculations for each tile in a bounding box for a primitive, tiling tests can be performed for a subset of the tiles. Then the results of the tiling tests for the subset of tiles can be used to determine whether the primitive is in other tiles which are located within a region bounded by two or more of the tiles of the subset. It is noted that the "other tiles" are not in the subset of tiles for which tiling tests are performed. In this way the tiling process can be implemented without performing tiling calculations for all of the tiles in the bounding box for a primitive. Reducing the number of tiling calculations can help to improve the efficiency of the graphics processing system (in terms of speed and power consumption) for rendering a primitive.

In step S402, the tiling unit 108 receives primitives from the pre-processing module 106. The operation of the tiling unit 108 is described in detail with reference to the flow chart shown in FIGS. 4a and 4b, but in summary the tiling unit 108 determines which of the primitives are present within each of the tiles of the rendering space of the graphics processing system 100. The processing logic 112 of the tiling unit 108 performs the operations of the tiling unit 108 described herein, and the data store 114 stores data of intermediate results of the tiling process, such as results of tiling calculations and partially filled display lists. The processing logic 112 may be implemented in dedicated hardware designed specifically for performing the operations of the tiling unit 108. Alternatively, the processing logic 112 may be implemented by executing software on a processor wherein the software is written such that when it is executed it causes the processor to perform the operations of the tiling unit 108.

Figure 2:
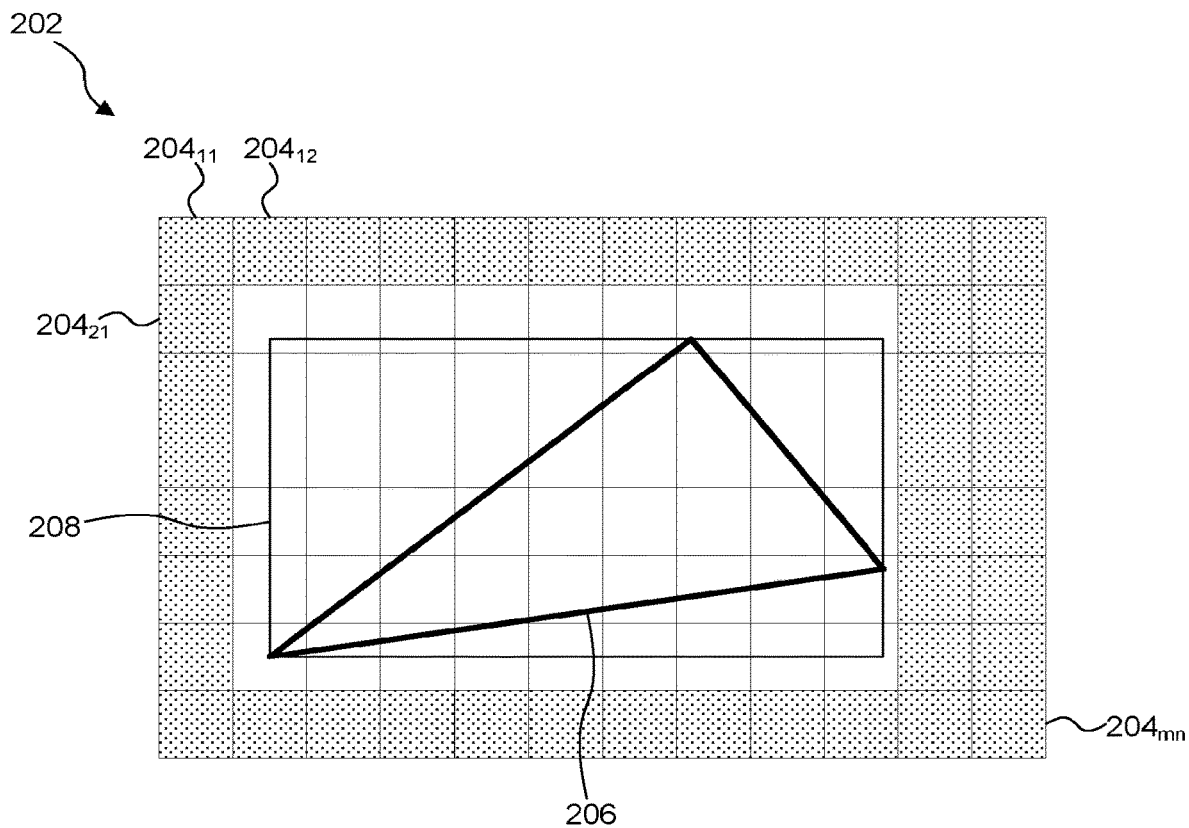
FIG. 2 shows a primitive in tiles of a rendering space.
Figure 3:
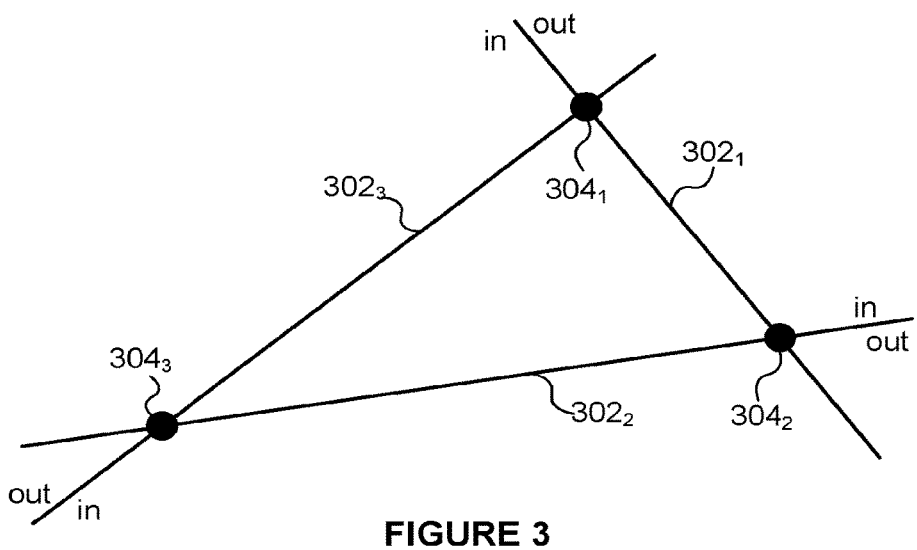
FIG. 3 illustrates edge lines which define the edges of a primitive.

The tiling unit 108 considers a first primitive. In step S404 a bounding box is determined for the primitive. In the examples described in detail herein, the bounding boxes are axis-aligned bounding boxes, i.e. they are aligned with the axes of the grid of tiles of the rendering space; but in other examples bounding boxes might not be axis aligned, i.e. they may be at an angle relative to the grid of tiles. If the primitive extends beyond the edges of the rendering space then the bounding box is clipped so that it does not extend beyond the edges of the rendering space. For example, the bounding box may be clipped so that it has an edge on the edge of the rendering space. The bounding box may be determined at the resolution of the tiles such that the edges of the bounding box are on tile boundaries (because in these examples, the bounding box is axis-aligned). If this is the case, the edges of the bounding box are extended outwards to the next tile boundary even if a closer tile boundary could be found by bringing the bounding box edge inwards. In this way the bounding box is determined conservatively so that it includes all of the tiles in which the primitive is located. Alternatively, the bounding box might be determined at a finer resolution than the tile resolution, for example, the bounding box 208 shown in FIG. 2 is not at the tile resolution. In these examples, a tile is determined to be in the bounding box if it at least partially overlaps with the bounding box.

Figure 5A:
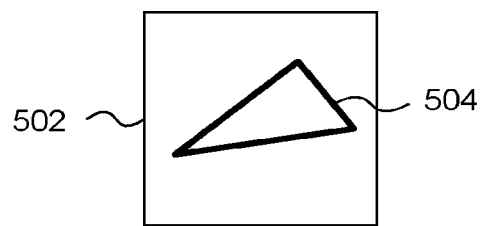
FIG. 5a shows an example of a primitive in a single tile of a rendering space.

In step S406, the tiling unit 108 determines whether the bounding box extends over more than one tile in both x and y directions. If this is not the case (i.e. if the bounding box extends over only one tile in either or both of the x and y directions) then, unless it is an exception case (e.g. one of the exception cases described below), the primitive will be in all of the tiles in the bounding box. For example, FIG. 5a shows a primitive 504 which lies in just one, single tile 502. There are other tiles in the rendering space which are not shown in FIG. 5a, but the primitive 504 does not overlap those other tiles. In this case, the tile 502 is the only tile in the bounding box, so the bounding box does not extend over more than one tile in either the x or the y direction. It is apparent that the primitive 504 is in the tile 502 and not in other tiles of the rendering space. Therefore, in this case, in order to determine which tile(s) the primitive 504 is in, the tiling unit 108 does not need to perform any tiling calculations involving floating point operations to compare edge lines of the primitive 504 with a test point in a tile. Therefore, the tiling process for primitive 504 can be performed very efficiently.

Figure 5B:
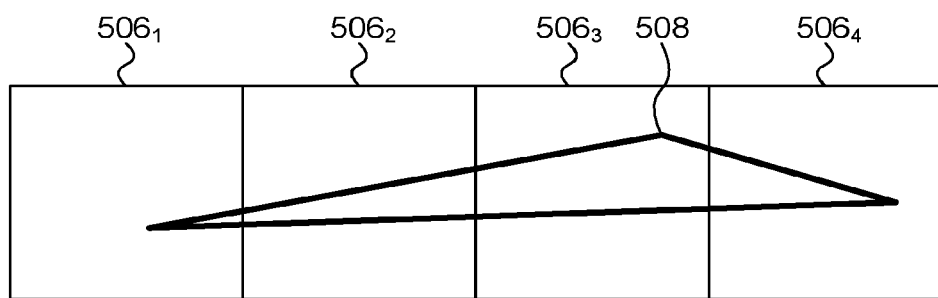
FIG. 5b shows an example of a primitive in a row of tiles of a rendering space.

Similarly, FIG. 5b shows a primitive 508 which lies in a row of tiles $506_1$, $506_2$, $506_3$ and $506_4$. There are other tiles in the rendering space which are not shown in FIG. 5b, but the primitive 508 does not overlap those other tiles. The bounding box for primitive 508 extends over four tiles in the x direction, but does not extend over more than one tile in the y direction. In this case, the tiles $506_1$, $506_2$, $506_3$ and $506_4$ are the only tiles in the bounding box, and it is apparent that the primitive 508 is in the tiles $506_1$, $506_2$, $506_3$ and $506_4$ and not in other tiles of the rendering space. Therefore, in this case, in order to determine which tile(s) the primitive 508 is in, the tiling unit 108 does not need to perform any tiling calculations involving floating point operations to compare edge lines of the primitive 508 with a test point in a tile. Therefore, the tiling process for primitive 508 can be performed very efficiently.

If the bounding box for the primitive does not extend over more than one tile in both x and y directions the method passes from step S406 to step S408 in which it is determined whether the bounding box is an exception case. The examples shown in FIGS. 5*a* and 5*b* are not exception cases. An exception case occurs when:
  (i) the bounding box for a primitive has been clipped to the edge of the rendering space, and the clipped edge of the bounding box extends over more than one tile; or
  (ii) the bounding box for a primitive has been clipped in two directions.

Figure 5C:
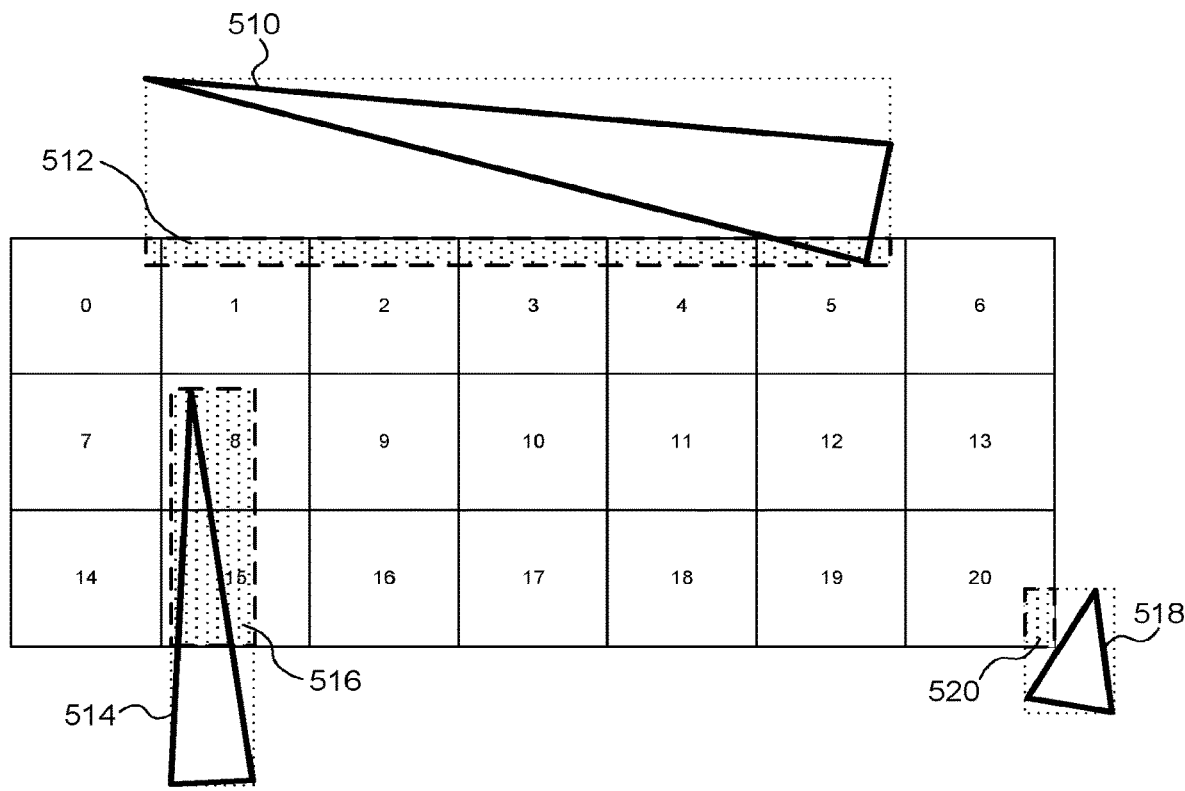
FIG. 5c shows three primitives for which bounding boxes have been clipped to the edges of the rendering space.

FIG. 5*c* shows three primitives, denoted 510, 514 and 518 within a rendering space which includes 21 tiles arranged in a 3×7 arrangement and labelled 0 to 20 in FIG. 5*c*. Primitive 510 has a bounding box 512 which has been clipped to the edge of the rendering space, and the bounding box 512 extends over parts of tiles 0, 1, 2, 3, 4 and 5. Therefore the bounding box 512 does not extend over more than one tile in the y direction (vertical direction), but the clipped edge of the bounding box 512 (the top edge of the bounding box 512) does extend over more than one tile in the x direction (horizontal direction), so the bounding box 512 is an exception case. It can be seen that the primitive 510 is not in all of the tiles in the bounding box 512. In this exception case, tiling calculations are to be performed on the tiles in the bounding box 512 in order to determine which tiles of the bounding box 512 the primitive 510 is in. Therefore, in exception cases such as this, the method passes from step S408 to step S412 which is described in more detail below.

As another example, primitive 514 has a bounding box 516 which has been clipped to the edge of the rendering space, and the bounding box 516 extends over parts of tiles 8 and 15. Therefore the bounding box 516 does not extend over more than one tile in the x direction, and in particular the clipped edge of the bounding box 516 (the bottom edge of the bounding box 516) does not extend over more than one tile (the clipped edge is only in tile 15). Furthermore, the bounding box 516 is not clipped in two directions. Therefore, the bounding box 516 is not an exception case according to the rules given above. It can be seen that the primitive 514 is in all of the tiles in the bounding box 516. Therefore, tiling calculations do not need to be performed on the tiles in the bounding box 516 in order to determine which tiles of the bounding box 516 the primitive 514 is in. Therefore, in non-exceptional cases such as this, the method passes from step S408 to step S410 which is described in more detail below. It is noted that bounding boxes which are not clipped (as in the examples described above with reference to FIGS. 5*a* and 5*b*) are not exceptional cases so in those cases the methods passes from step S408 to step S410.

As a further example, primitive 518 has a bounding box 520 which has been clipped in two directions. Therefore the bounding box 520 is an exception case according to the rules given above. It can be seen that the primitive 518 is not in the tile of the bounding box 520. Since this is an exception case, tiling calculations are to be performed on the tile in the bounding box 520 (tile 20) in order to determine whether the primitive 518 is in the tile (tile 20) of the bounding box 520. Therefore, in this case, the method passes from step S408 to step S412.

It is noted that in some examples the detection and handling of exception cases may be optional. An efficiency loss may be incurred if exceptional primitives (e.g. primitives 510, 514 or 518) are not treated separately, because the exceptional primitives may then be added to the display lists of more tiles than necessary. However, this does not lead to a rendering error, so it may be acceptable. If the exception cases are not handled separately, the processing involved in step S408 can be avoided, at the expense of including some exceptional primitives in more display lists than is strictly necessary.

For each tile in the rendering space, the tiling unit 108 creates a display list, which may be stored, e.g. in the store 114, while the tiling unit 108 is processing the primitives. The display list for a tile includes primitive identifiers which indicate which of the primitives are in that tile. In step S410, for non-exceptional cases, the tiling unit 108 adds a primitive identifier of the primitive currently being processed to the display list(s) for the respective tile(s) in the bounding box. For example, in the example shown in FIG. 5*a*, the primitive identifier for primitive 504 would be added to the display list for tile 502 but not to display lists for other tiles in the rendering space. Similarly, in the example shown in FIG. 5*b*, the primitive identifier for primitive 508 would be added to the display lists for tiles 506$_1$, 506$_2$, 506$_3$ and 506$_4$ but not to display lists for other tiles in the rendering space. Similarly, in the example shown in FIG. 5*c*, the primitive identifier for primitive 514 would be added to the display list for tiles 8 and 15 but not to display lists for the other tiles in the rendering space. In this way a primitive can be tiled very efficiently without performing the tiling calculations on the edge equations as mentioned above. It is noted that in some tests, it was found that over 70% of primitives in an average scene can be tiled in this way without performing the tiling calculations on the edge equations. The method passes from step S410 to step S430, which is described below.

Figure 6:
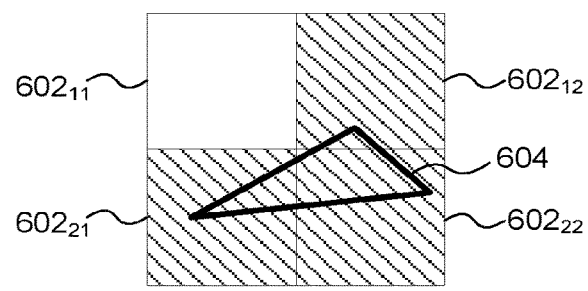
FIG. 6 shows a primitive in three tiles of a 2×2 square of tiles of a rendering space.

If it is determined in step S406 that the bounding box does extend over more than one tile in both the x and y directions then the method passes from step S406 to step S412. In step S412 the tiling unit 108 identifies tiles in which the vertices of the primitive are located, thereby determining that the primitive is in the identified tiles. It is noted that more than one of the vertices of the primitive may be in the same tile. It is simple to identify the tiles in which the vertices are located because the vertex locations have already been used to determine the bounding box. Step S412 can be performed efficiently (in terms of time and power consumption), without performing further tiling tests for determining whether the primitive is in the identified tiles. For example, FIG. 6 shows a primitive 604, wherein the bounding box of the primitive 604 includes a 2×2 group of tiles denoted 602$_{11}$, 602$_{12}$, 602$_{21}$ and 602$_{22}$. The tiles shown with hatching in FIG. 6 (tiles 602$_{12}$, 602$_{21}$ and 602$_{22}$) are identified in step S412 because they each include a vertex of the primitive 604. Therefore the tiling unit 108 can easily determine that the primitive is in the hatched tiles, e.g. without performing tiling calculations on the edge equations for the primitive 604.

In step S414 the primitive identifier is added to the display lists for the identified tiles.

In step S416 the tiling unit 108 determines whether there are more tiles in the bounding box to be processed. A tile is still to be processed if it has not yet been determined whether the primitive is in the tile. For example, if all of the tiles of the bounding box include a vertex of the primitive then it is already determined that the primitive is in all of the tiles of the bounding box, so there are no more tiles in the bounding box to be processed. In this case, the method passes from step S416 to step S430. However, if there are more tiles in the bounding box to be processed (i.e. more tiles for which it is not yet determined whether the primitive is in the tile) then the method passes to step S418. For example, with reference to FIG. 6, it is still not determined whether the primitive 604 is in the tile $602_{11}$, so the method passes to step S418.

Figure 7A:
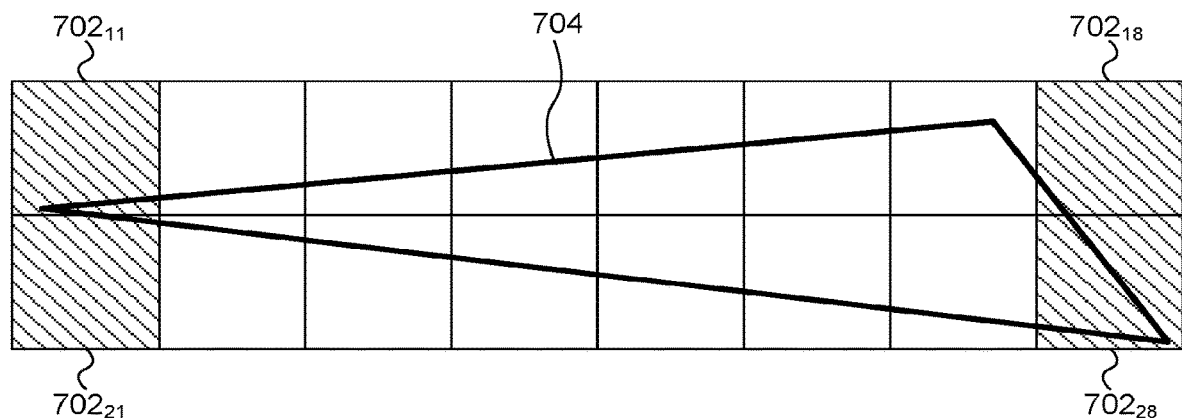
FIG. 7a shows a primitive in a 2×8 rectangle of tiles of a rendering space.

In step S418, for each tile of at least a subset of the tiles, if it has not already been determined, the tiling unit 108 determines whether the primitive is in that tile. For example, where the bounding box includes more than four tiles, the subset of tiles may include the corner tiles which are in the corners of the bounding box. An example of this is shown in FIG. 7a which shows a primitive 704 with a bounding box including a 2×8 array of tiles 702. The corner tiles are shown with hatching in FIG. 7a, and are denoted $702_{11}$, $702_{18}$, $702_{21}$ and $702_{28}$.

Figure 8:
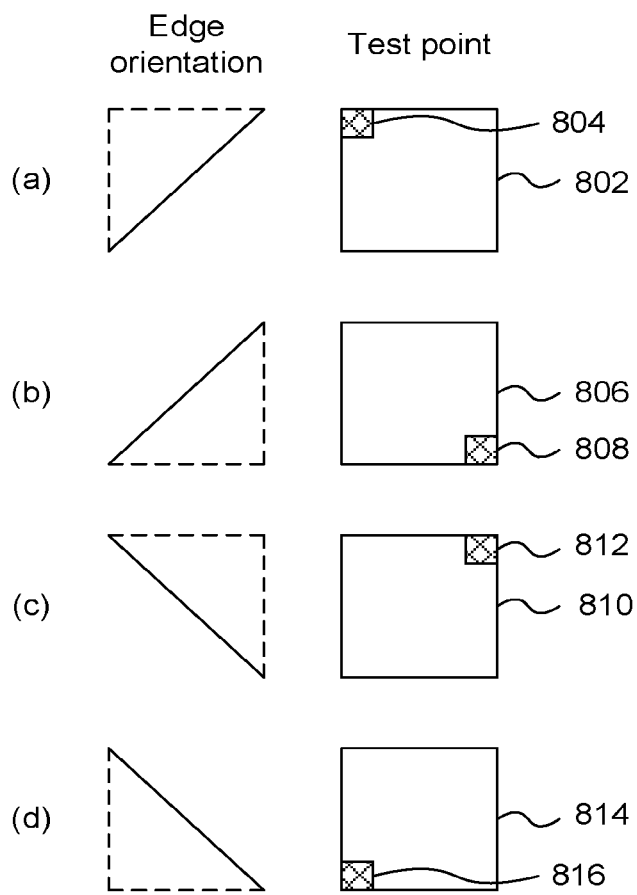
FIG. 8 shows edge-specific test points in a tile for respective edge orientations.

A vertex of the primitive 704 is in tile $702_{11}$, and another vertex of the primitive 704 is in tile $702_{28}$, so the tiling unit 108 has already determined that the primitive 704 is in corner tiles $702_{11}$ and $702_{28}$. In step S418 the tiling unit 108 determines whether the primitive 704 is in tiles $702_{18}$ and $702_{21}$ by performing tiling calculations. In order to perform the tiling calculations on the primitive for a tile, for each edge of the primitive, an edge equation describing the edge of the primitive is used to determine whether an edge-specific test point in the tile is inside or outside of the edge. The primitive is determined to be outside of the tile if it is determined, for any of the edges, that the respective edge-specific test point is outside of the edge. The test point of the tile is different depending on the orientation of the edge which it is tested against because a primitive should be determined to be in a tile if any part of the primitive is inside any part of the tile. Therefore, the edge-specific test point in a tile for an edge is the point in the tile which is the most likely to be inside the edge in accordance with the orientation of the edge. For example, FIG. 8 shows the test point which is used for different edge orientations. Row (a) of FIG. 8 shows that for an upward sloping edge wherein points outside of the edge are below and/or to the right of the edge, the edge specific test point 804 is in the top left corner of a tile 802 (e.g. the top left sample position within the tile 802). It can be appreciated that if the test point 804 is outside of the edge then so are all of the other points in the tile 802. Similarly, row (b) of FIG. 8 shows that for an upward sloping edge wherein points outside of the edge are above and/or to the left of the edge, the edge specific test point 808 is in the bottom right corner of a tile 806 (e.g. the bottom right sample position within the tile 806). It can be appreciated that if the test point 808 is outside of the edge then so are all of the other points in the tile 806. Similarly, row (c) of FIG. 8 shows that for a downward sloping edge wherein points outside of the edge are below and/or to the left of the edge, the edge specific test point 812 is in the top right corner of a tile 810 (e.g. the top right sample position within the tile 810). It can be appreciated that if the test point 812 is outside of the edge then so are all of the other points in the tile 810. Similarly, row (d) of FIG. 8 shows that for a downward sloping edge wherein points outside of the edge are above and/or to the right of the edge, the edge specific test point 816 is in the bottom left corner of a tile 814 (e.g. the bottom left sample position within the tile 814). It can be appreciated that if the test point 816 is outside of the edge then so are all of the other points in the tile 814.

Therefore, referring to FIG. 7a again, for each tile in the subset (e.g. the corner tiles $702_{11}$, $702_{18}$, $702_{21}$ and $702_{28}$) a tiling test has been performed to determine whether the primitive 704 is in the respective tile. As described above, the tiling test may comprise determining that the primitive 704 has one or more vertices in the tile, or the tiling test may comprise performing tiling calculations to determine whether the primitive is in the tile. If the primitive is in a tile then the primitive identifier is added to the appropriate display list for the tile.

In step S420 the tiling unit 108 determines whether there are more tiles in the bounding box to be processed. A tile is still to be processed if it has not yet been determined whether the primitive is in the tile. If there are no more tiles in the bounding box to be processed, the method passes from step S420 to step S430. However, if there are more tiles in the bounding box to be processed (i.e. more tiles for which it is not yet determined whether the primitive is in the tile) then the method passes to step S422. For example, with reference to FIG. 7a, it is still not determined whether the primitive 704 is in the non-corner tiles which do not include a vertex of the primitive 704, so the method passes to step S422.

In step S422 the tiling unit 108 analyses the subset of tiles for which a tiling test has been performed. This analysis is performed to determine whether the results of tiling at least one other tile in the bounding box can be inferred from the results of the tiling tests for two or more of the subset of tiles, without needing to perform a tiling test for said at least one other tile. In examples described herein, the primitives are known to be convex, such that the results of tiling at least one tile in the bounding box can be correctly inferred from the results of the tiling tests for two or more of the subset of tiles. In some examples, all primitives may be known to be convex (e.g. all primitives may be triangles), but in some other examples, incoming primitives might not necessarily be strictly convex, and in these examples the methods may involve determining whether a primitive is convex, wherein if the primitive is convex then methods may be performed as described herein to infer tiling results for tiles based on tiling results for two or more of a subset of tiles; whereas if the primitive is not convex then other methods may be used for performing tiling on the primitive.

In step S424, if the analysis indicates that it is possible, the results of the tiling tests for two or more of the tiles of the subset are used to determine whether the primitive is in the at least one other tile. The at least one other tile is not in the subset of tiles for which tiling tests are performed. In particular, the at least one other tile is located within a region bounded by the two or more of the tiles of the subset. If a particular tile is surrounded by tiles from the subset which all have the same tiling test results then it can be inferred that the particular tile will also have the same results. The tile may be "surrounded" in one dimension, i.e. the tile may be located between two tiles of the subset in a row or column of tiles. That is, two tiles of the subset in the same row or column of tiles may be used to infer the tiling results for tiles in that same row or column of tiles between (i.e. in a region bounded by) the two tiles of the subset. Furthermore, the tile may be "surrounded" in two dimensions, i.e. the tile may be located in a region bounded by four tiles of the subset. That is, four tiles arranged in a rectangle within the rendering space may be used to infer the tiling results for tiles in the region bounded by those four tiles, i.e. in a rectangle having those four tiles in the corners. It is noted that the term "rectangle" includes "square".

It is noted that, while a tile being surrounded by tiles that include a primitive allows it to be inferred that that tile also includes the primitive, it is not inferred that a tile does not include the primitive based solely on a determination that the tile is surrounded by tiles that do not include the primitive. However, when two or more tiles do not include a primitive because they are both outside the same edge of the primitive, then it may be inferred that any tiles which they surround are also outside that edge, and are therefore also outside the primitive. Therefore, per-edge results may be determined for the tiles of the subset which do not include the primitive. In this way, when a tile is surrounded by two or more tiles of the subset which do not include the primitive, it can be checked that those surrounding tiles are outside of the same edge of the primitive, and in that case it is inferred that the surrounded tile is also outside of the primitive. However, if the surrounding tiles are outside of different edges of the primitive then it is not inferred that the surrounded tile is also outside of the primitive. It is noted that when inferring that a tile includes the primitive, the problem is simplified by the fact that to include a primitive, a tile is determined to be inside all of the edges. Therefore, there is no need to use per-edge results for inferring that a tile includes a primitive based on determining that surrounding tiles of the subset include the primitive.

If the subset of tiles includes the corner tiles of the bounding box (as in FIG. 7a) then if the results of the tiling tests for the subset of tiles indicate that the primitive is in all of the corner tiles of the bounding box (as in FIG. 7a) then those results are used to determine that the primitive (e.g. 704 in FIG. 7a) is in all of the tiles of the bounding box. In this way, in the example shown in FIG. 7a, the results of the tiling tests for twelve of the tiles can be inferred without needing to perform tiling tests specifically for each of those tiles.

Figure 7B:
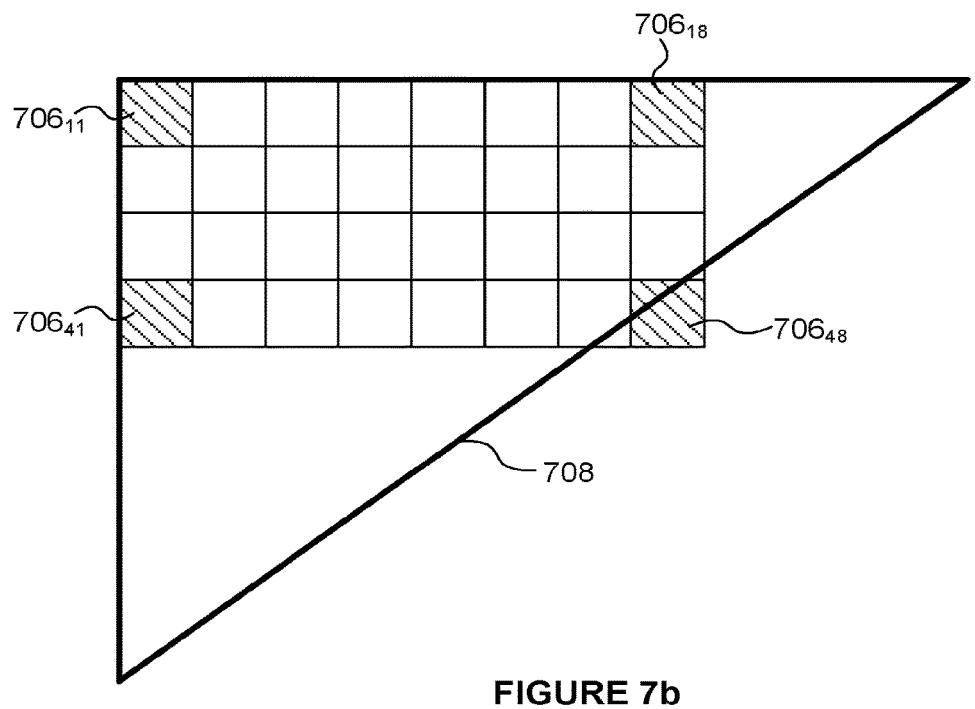
FIG. 7b shows a primitive which extends beyond the edges of a rendering space which includes a 4×8 array of tiles.

FIG. 7b shows a rendering space including 32 tiles arranged in a 4×8 grid. A large primitive 708 is in all of the tiles 706 of the rendering space. The bounding box for the primitive 708 will be clipped to the edges of the rendering space. In this example, the tiling unit determines whether the primitive 708 is in the corner tiles $706_{11}$, $706_{18}$, $706_{41}$ and $706_{48}$ which are shown with hatching in FIG. 7b. These four tiles make up the subset of tiles in this example. The tiling test for tile $706_{11}$ involves determining that a vertex of the primitive 708 is in the tile $706_{11}$, whereas the tiling tests for tiles $706_{18}$, $706_{41}$ and $706_{48}$ involve performing tiling calculations based on the edge equations of the primitive 708 as described above to determine whether the primitive 708 is in the respective tile 706. By analysing the results of the tiling tests for the four corner tiles, the tiling unit 108 can determine in this example that, since the primitive is in the four corner tiles, then the primitive is also in all of the other tiles in the rendering space, without needing to perform tiling calculations for the respective other tiles of the rendering space. As described above, if the primitive is determined to be in a tile then the primitive identifier is added to the display list for the respective tile.

The method continues to step S426 in which the tiling unit 108 determines whether there are more tiles in the bounding box to be processed. A tile is still to be processed if it has not yet been determined whether the primitive is in the tile. If there are no more tiles in the bounding box to be processed (as is the case in the examples shown in FIGS. 7a and 7b), the method passes from step S426 to step S430. However, if there are more tiles in the bounding box to be processed (i.e. more tiles for which it is not yet determined whether the primitive is in the tile) then the method passes to step S428. In step S428, for each remaining tile (i.e. for each tile for which it is not yet determined whether the primitive is in the tile) tiling calculations are performed to determine whether the primitive is in the tile, and if so, the primitive identifier is added to the display list for the tile. As described above, the tiling calculations for a particular tile include comparing the line equations for the edges of the primitive with edge-specific test points of the particular tile. Therefore, following step S428 it has been determined for all of the tiles in the rendering space whether the primitive is in the tile, and the primitive identifier has been added to the display lists for the respective tiles accordingly. The method then passes to step S430.

In step S430 the tiling unit 108 determines whether there are more primitives to tile in the current render. Each render will likely include many primitives (e.g. thousands or millions of primitives). The render may for example be performed to generate an image from a 3 dimensional model to be displayed on screen or to be used as a texture in other renders. If there are more primitives to tile then the method passes back to step S404 and repeats for the next primitive. Once all of the primitives in the current render have been tiled then the method will pass from step S430 to step S432 in which the display lists for the tiles are output from the tiling unit 108 and stored in the memory $104_1$. As described above, in examples described herein, whilst the display lists are being created they may be stored in the store 114 which is internal to the tiling unit 108. In some examples, once all of the primitives for a render have been tiled then the display lists are complete and they are passed to the off-chip memory $104_1$ for storage therein. In other examples, the tiling unit 108 might not include an internal store (such as store 114) for use in storing display lists, and instead primitive identifiers may be written directly to display lists in memory $104_1$ as tiling is performed. In some further examples, the internal store 114 may be implemented in the tiling unit 108, but the internal store 114 might not be big enough to store all of the display lists for all of the tiles at once. Therefore, the internal store 114 may be used to gather tiling results that can then be written out to memory $104_1$ in chunks (or "batches") as the tiling is performed. This can avoid inefficient memory access patterns when primitives are written to different display lists in memory $104_1$.

The rendering unit 110 can then render the primitives in each of the tiles in accordance with the display lists. In order to render the primitives for a tile, in step S434 the rendering unit 110 retrieves the appropriate display list from the memory $104_1$ for the tile. The rendering unit 110 can then retrieve the primitives indicated by the display list as being in the tile currently being rendered. These primitives may be retrieved from the memory $104_1$. The rendering unit 110 then renders the primitives in the tile. In the example shown in FIG. 1, the rendering unit 110 implements deferred rendering whereby hidden surface removal is performed before texturing and/or shading. Therefore, the HSR module 116 performs hidden surface removal to thereby remove fragments of primitives which are hidden in the scene. The remaining fragments are passed to the texturing/shading module 118 which performs texturing and/or shading on the fragments to determine a rendered result, e.g. to determine pixel colour values of a rendered image. In step S436 the rendered result is output and can be passed to the memory $104_2$, e.g. for storage in a frame buffer. The rendering unit 110 processes primitives in each of the tiles and when the whole image has been rendered and stored in the memory $104_2$, the image can be outputted from the graphics processing system 100 and, for example, displayed on a display. It is noted that in other examples, the rendering unit might be a non-deferred rendering unit whereby texturing and/or shading can be performed on primitives before hidden surface removal.

Figure 9:
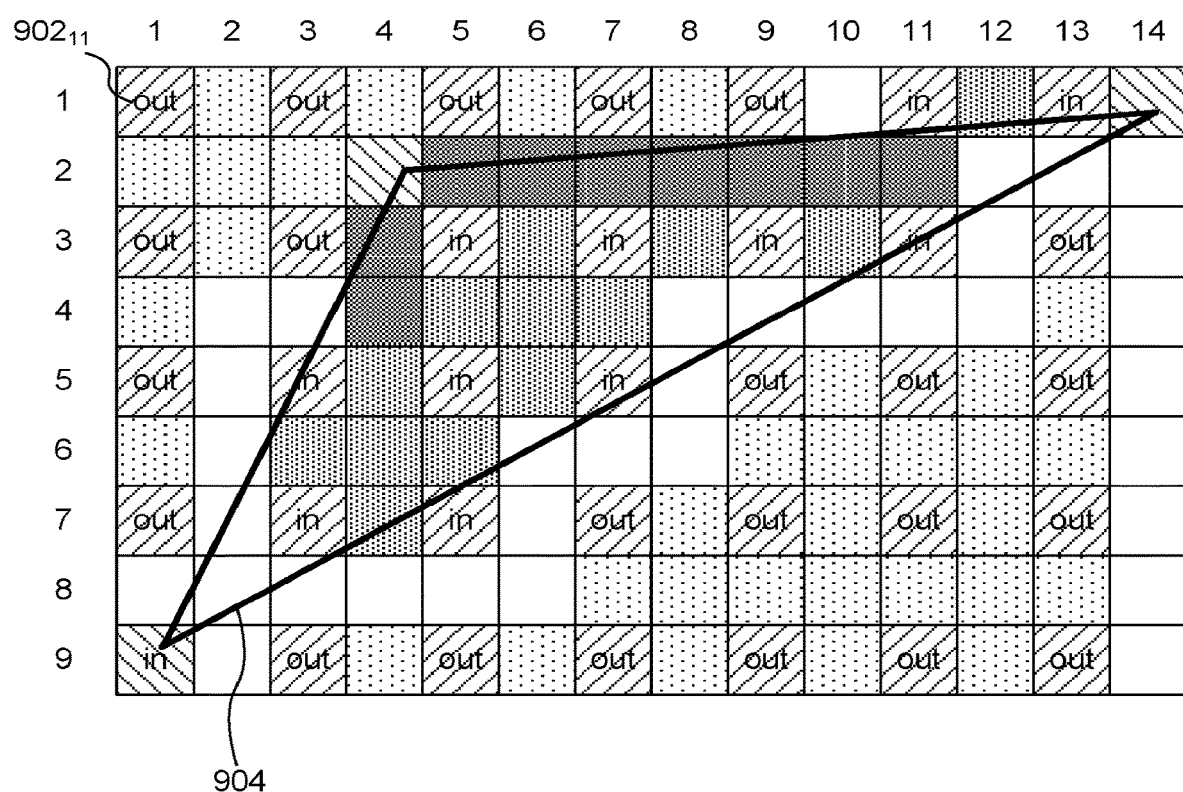
FIG. 9 shows an example of a primitive in some of a 9×14 rectangle of tiles of a rendering space.

In the examples described above it can be seen that by performing tiling tests to determine whether a primitive is in a subset of the tiles, the results of those tiling tests can be used to determine whether the primitive is in other tiles which are located within a region bounded by some of the tiles of the subset. The examples shown in FIGS. 7a and 7b show the subset of tiles being the corner tiles of the bounding box. In other examples the subset of tiles may be different tiles within the bounding box. For example, there may be a regular spacing between the tiles of the subset of tiles. For example, the subset of tiles may include a respective tile from each of a plurality of N×M blocks of tiles of the rendering space, where N and M are integers. FIG. 9 shows an example in which N=M=2. That is, in FIG. 9, tiling tests are performed on a 2×2 tile grid such that one tile from each 2×2 block of tiles is in the subset of tiles for which a tiling test is performed.

FIG. 9 shows a primitive 904, wherein a 9×14 group of tiles are in the bounding box of the primitive 904. Row numbers (1 to 9) and column numbers (1 to 14) are shown in FIG. 9. The location of the vertices of the primitive 904 are used to determine that the vertices of primitive 904 are in the fourteenth tile of the first row (tile $T_{1,14}$), in the fourth tile of the second row (tile $T_{2,4}$), and in the first tile of the ninth row (tile $T_{9,1}$) (in step S412). These three tiles are shown with downward sloping hatching in FIG. 9. Tiling calculations involving comparing edge equations to test points do not need to be performed for these three tiles.

In FIG. 9, the tiles of the subset of tiles are shown with upward sloping hatching (except for the first tile of the ninth row (tile $T_{9,1}$) which is in the subset but which has downward sloping hatching because a vertex is located in that tile), including as an example tile $902_{11}$ (tile $T_{1,1}$). The tiles of the subset include the first, third, fifth, seventh, ninth, eleventh and thirteenth tiles from the first, third, fifth, seventh and ninth rows of tiles in the bounding box. It can be appreciated that due to the location of the vertices of the primitive 904, the tiling unit 108 has determined that the primitive is in the first tile of the ninth row (tile $T_{9,1}$). For the other tiles of the subset, tiling calculations are performed (in step S418) to determine whether the primitive 904 is in the tiles. These tiling calculations are performed as described above by comparing edge equations of the primitive 904 to test points in the tiles. Results of the tiling tests performed on the subset of tiles are shown in FIG. 9 by indicating for each tile of the subset whether the primitive 904 is "in" the tile or "out" of the tile.

The results of the tiling tests (including the per-edge results, which as described above are for use in inferring whether tiles do not include the primitive) for the subset of tiles can then be analysed (in step S422) to determine whether there are 3×3 blocks of tiles which have tiles from the subset of tiles in the corners, wherein those tiles of the subset have the same tiling test results. If this is the case then the remaining five tiles in the 3×3 block can be assigned the same results as the relevant tiles of the subset (in step S424), without performing specific tiling calculations for those five tiles. For example, the 3×3 block of tiles shown in FIG. 9 in the top left corner of the bounding box (i.e. the first three tiles in the first three rows of the bounding box) includes tiles of the subset (tiles $T_{1,1}$, $T_{1,3}$, $T_{3,1}$ and $T_{3,3}$) in the four corners for which the tiling test results indicate that the primitive 904 is outside those tiles and in particular, that the primitive 904 is outside those tiles because the tiles are all outside the same edge of the primitive 904 (e.g. outside the left edge of the primitive 904 as shown in FIG. 9). Therefore, it can be inferred from the tiling results for the subset of tiles that the primitive 904 is outside of the other five tiles in that 3×3 block (tiles $T_{1,2}$, $T_{2,1}$, $T_{2,2}$, $T_{2,3}$ and $T_{3,2}$), which are in the region bounded by the four tiles of the subset, without performing any further tiling tests for those five tiles. Similarly, the 3×3 block of tiles shown in FIG. 9 in the fifth to seventh rows and the third to fifth columns of the bounding box includes tiles of the subset (tiles $T_{5,3}$, $T_{5,5}$, $T_{7,3}$ and $T_{7,5}$) in the four corners for which the tiling test results indicate that the primitive 904 is inside those tiles. Therefore, it can be inferred from the tiling results for the subset of tiles that the primitive 904 is in the other five tiles in that 3×3 block (tiles $T_{5,4}$, $T_{6,3}$, $T_{6,4}$, $T_{6,5}$ and $T_{7,4}$), which are in the region bounded by the four tiles of the subset, without performing any further tiling tests for those five tiles.

Similarly, the results of the tiling tests for the subset of tiles can be analysed (in step S422) to determine whether there are two tiles of the subset in a line (e.g. in the same row or column) which have the same tiling test results. If this is the case then the other tile(s) between those two tiles of the subset can be assigned the same results as the relevant tiles of the subset (in step S424), without performing specific tiling calculations for those other tile(s). For example, the tiling tests for the first tile in the third and fifth rows of the bounding box (tiles $T_{3,1}$ and $T_{5,1}$) indicate that the primitive 904 is outside those tiles, and that the tiles $T_{3,1}$ and $T_{5,1}$ are outside of the same edge of the primitive 904. Therefore, it can be inferred from the tiling results for the subset of tiles that the primitive 904 is outside of the first tile in the fourth row (tile $T_{4,1}$) (which is in the region bounded by the two tiles of the subset (tiles $T_{3,1}$ and $T_{5,1}$)) without performing a further tiling test for that tile. Similarly, the tiling tests for the seventh and ninth tiles in the third row of the bounding box (tiles $T_{3,7}$ and $T_{3,9}$) indicate that the primitive 904 is inside those tiles. Therefore, it can be inferred from the tiling results for the subset of tiles that the primitive 904 is in the eighth tile in the third row (tile $T_{3,8}$) (which is in the region bounded by the two tiles of the subset (tiles $T_{3,7}$ and $T_{3,9}$)) without performing a further tiling test for that tile.

In some examples, steps S422 and S424 may be repeated so that further analysis of the tiling results may be implemented, e.g. based on the tiles in which the vertices of the primitive are located. This may allow the tiling results of further tiles to be inferred without performing specific tiling calculations for those further tiles based on comparisons involving edge equations. For example, after the first analysis of the tiling tests for the subset of tiles, it has been inferred that the primitive 904 is inside the eleventh tile in the second row of the bounding box (tile $T_{2,11}$) shown in FIG. 9. It is also known that the primitive 904 is in the fourth tile in the second row of the bounding box (tile $T_{2,4}$) due to the location of one of the vertices of the primitive 904. Therefore, in a further analysis stage it can be inferred that the primitive 904 is in the fifth to tenth tiles in the second row of the bounding box (tiles $T_{2,5}$ to $T_{2,10}$) without performing tiling calculations for those tiles. Similarly in a further analysis stage it can be inferred that the primitive 904 is in the third and the fourth tiles in the fourth column of the bounding box (tiles $T_{3,4}$ and $T_{4,4}$) without performing tiling calculations for those tiles.

Tiles for which the tiling results are inferred from tiling results of tiles of the subset are shown in FIG. 9 with dotted shading. The lightest dotted shading indicates that the primitive 904 is outside of the tiles, whereas the two types of darker dotted shading indicate that the primitive 904 is inside the tiles. The lighter of the two darker dotted shading indicates that the primitive 904 is determined to be inside the tile after the first analysis, and the darker of the two darker dotted shading indicates that the primitive 904 is determined to be inside the tile after a further analysis.

As described above, it is noted that when the results of the tiling tests are analysed, if the tiling tests indicate that the primitive is outside of a group of tiles of the subset, then the reason for the primitive being outside of the tile should be taken into account, i.e. which edge of the primitive is the tile outside. For the results of a plurality of tiles of the subset to be used to infer that the primitive is outside of another tile then all of the plurality of tiles of the subset should be outside of the same edge of the primitive, otherwise it could be erroneously inferred that the primitive is outside of the other tile.

In step S428, tiling calculations are performed using edge equations and test points within tiles, for the remaining tiles in FIG. 9 (i.e. those tiles which have no shading or hatching), such that the tiling of the primitive 904 is complete. In the example shown in FIG. 9, the bounding box includes 126 tiles. Tiling calculations based on edge equations are performed for 68 of the tiles; the tiling test for 3 of the tiles involves identifying which tiles the vertices of the primitive 904 are in; and for the other 55 tiles, the determination as to whether the primitive 904 is in the tiles is inferred from the results of the tiling tests for other tiles in the bounding box. In the previous systems described in the background section above, the tiling calculations would be performed for each of the tiles in the bounding box, i.e. for 126 tiles in the example shown in FIG. 9. Therefore, in this example, the method described herein avoids performing the tiling calculations for 58 of the tiles (46% of the tiles). Since the tiling calculations involve floating points operations and take significant processing resources and time to implement, the reduction in the number of tiles for which tiling calculations are performed will significantly improve the efficiency (in terms of speed and power consumption) of the tiling process in this example.

The number of tiles included in the subset could be varied. In particular, the tiling of the primitive could be implemented in a hierarchical manner such that, in a first (coarse) stage the tiling tests are performed for a subset of tiles and the results of the tiling tests are used to determine whether the primitive is in at least one other tile at a relatively coarse resolution with the subset of tiles including a respective tile from each of a plurality of $N_1 \times M_1$ blocks of tiles of the rendering space. Then in a second (fine) stage the tiling tests are performed for a subset of tiles and the results of the tiling tests are used to determine whether the primitive is in at least one other tile at a relatively fine resolution with the subset of tiles including a respective tile from each of a plurality of $N_2 \times M_2$ blocks of tiles of the rendering space, wherein $N_1 > N_2$ and/or $M_1 > M_2$. For example, in the first stage $N_1$ and $M_1$ may equal 4 such that the subset of tiles includes a respective tile from each of a plurality of 4×4 blocks of tiles of the rendering space, then in the second stage $N_2$ and $M_2$ may equal 2 such that the subset of tiles includes a respective tile from each of a plurality of 2×2 blocks of tiles of the rendering space. In this way, if possible, in the first stage the tiling results can be inferred for large areas of the bounding box if all the tiles in those areas have the same tiling results without performing many tiling calculations, then in the second stage the tiling results can be inferred for remaining smaller areas of the bounding box if all the tiles in those areas have the same tiling results. In another example, in the first stage, only the corner tiles of the bounding box may be included in the subset of tiles, then in the second stage, a respective tile from each of a plurality of $N_2 \times M_2$ blocks of tiles may be included in the subset of tiles. Furthermore, in other examples, more than two stages may be implemented at different resolutions, i.e. there may be more than two stages in the hierarchy.

With reference to FIGS. 10 and 11*a* to 11*d*, another way of tiling a primitive is described, which can be implemented by the tiling unit 108 in addition to, or as an alternative to, the tiling methods described above.

Figure 10:
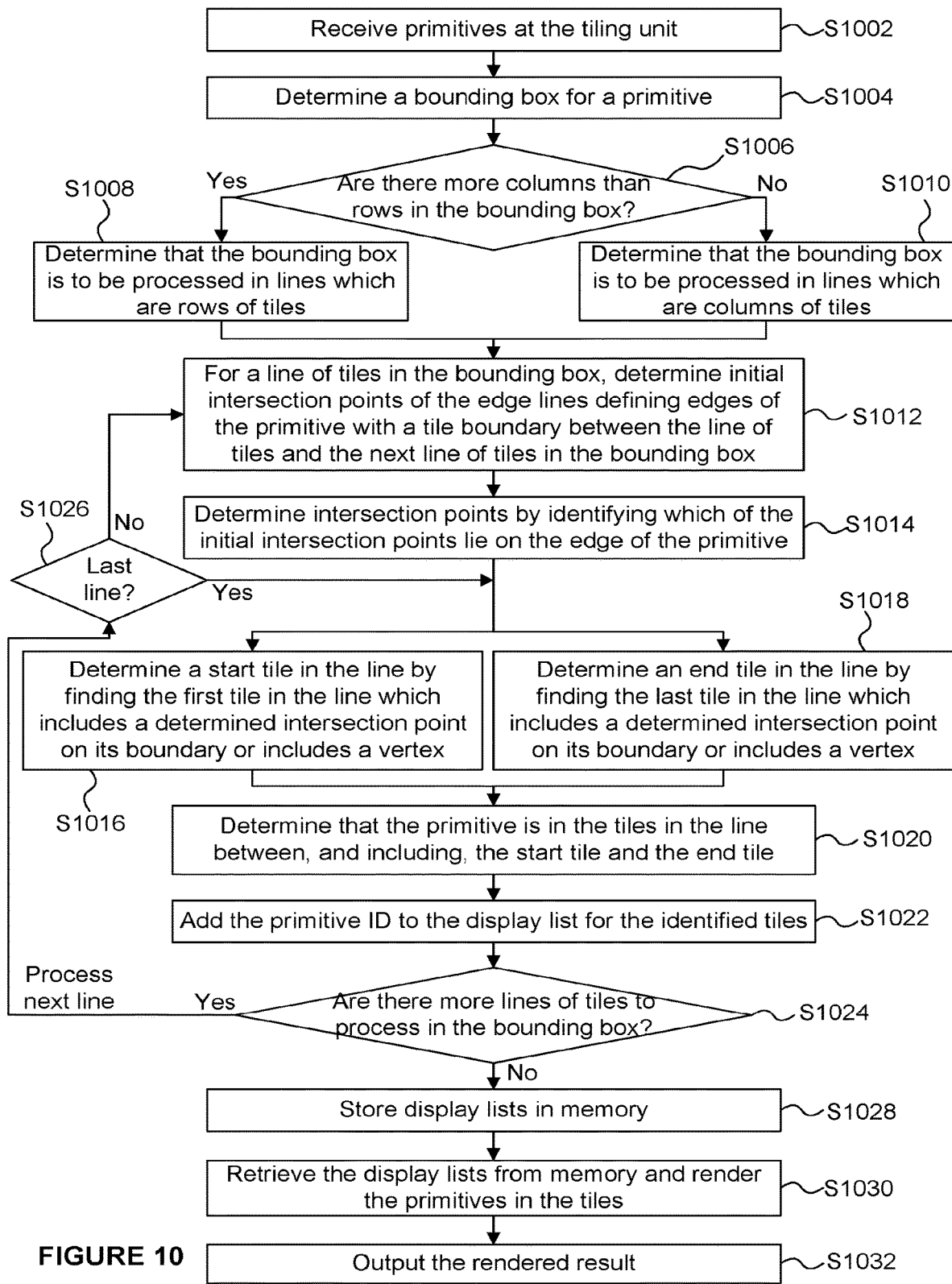
FIG. 10 shows a flow chart illustrating a second method of processing primitives in a graphics processing system.

With reference to the flow chart shown in FIG. 10, in step S1002, the tiling unit 108 receives primitives from the pre-processing module 106. The tiling unit 108 considers a first primitive. In step S1004 a bounding box is determined for the primitive, e.g. in the same manner as described above, and if the primitive extends beyond the edges of the rendering space then the bounding box is clipped so that it does not extend beyond the edges of the rendering space. As described above, a tile is determined to be in the bounding box if it at least partially overlaps with the bounding box. A primitive is determined to not be in tiles which do not at least partially overlap with the bounding box.

In the method described with reference to FIGS. 10 and 11*a* to 11*d*, lines of tiles in the bounding box are processed at a time, wherein the lines may be rows or columns. It can be beneficial to set the lines to be rows if there are more columns of tiles than rows of tiles in the bounding box; whereas it can be beneficial to set the lines to be columns if there are more rows of tiles than columns of tiles in the bounding box. Therefore, the lines of tiles are chosen to be in the dimension having the lowest number of lines of tiles in the bounding box. This is beneficial because the number of calculations that are performed for tiling a primitive scales linearly with the number of lines in the bounding box, so choosing the dimensionality of the lines to be a minimum may reduce the amount of processing involved in tiling the primitive. In step S1006 the tiling unit 108 determines whether there are more columns of tiles than rows of tiles in the bounding box. If there are more columns of tiles than rows of tiles in the bounding box then in step S1008 the tiling unit 108 determines that the bounding box is to be processed in rows of tiles. Alternatively, if there are not more columns of tiles than rows of tiles in the bounding box then in step S1010 the tiling unit 108 determines that the bounding box is to be processed in columns of tiles.

As a broad overview of the method described in detail with reference to the flow chart shown in FIG. 10, for each of one or more tile boundaries between lines of tiles in the bounding box, the tiling unit 108 determines intersection points of the tile boundary with edges of the primitive, and uses the determined intersection points to determine which of the tiles in the bounding box the primitive is in.

FIGS. 11*a* to 11*d* show an example of a primitive 1102 with a bounding box which includes a 6×4 group of tiles. In this example there are more rows of tiles than columns of tiles in the bounding box, so in step S1010 the tiling unit 108 determines that the bounding box is to be processed in columns of tiles. In the example described below the bounding box is processed in columns of tiles, but it should be appreciated that in other examples the bounding box may be processed in rows of tiles, if that is appropriate.

Figure 11A:
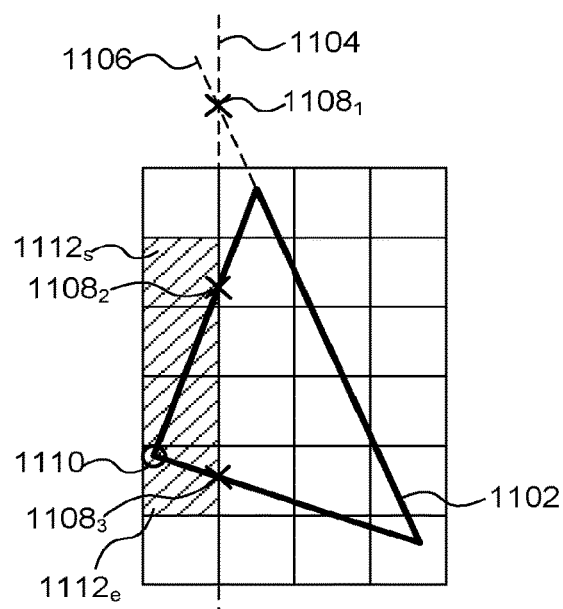
FIGS. 11a to 11d illustrate four different stages of the tiling process of the second method.

A first column of tiles in the bounding box is considered, wherein the tile boundary 1104 between the first and second columns of tiles is considered. In step S1012, for the first column of tiles in the bounding box, the tiling unit determines initial intersection points of the tile boundary 1104 with edge lines defining edges of the primitive 1102. Two of the edges of the primitive 1102 cross the tile boundary 1104, whereas for the other edge of the primitive, the edge line 1106 which defines the edge intersects with the tile boundary 1104 at a position which is outside of the primitive 1102. The initial intersection points are shown in FIG. 11a at points $1108_1$, $1108_2$ and $1108_3$. Unless one of the edges of the primitive 1102 is parallel to the tile boundary 1104 then there will be three initial intersection points 1108, two of which ($1108_2$ and $1108_3$ in the example shown in FIG. 11a) will lie on the edge of the primitive 1102 and are useful for determining which of the tiles the primitive 1102 is in, whilst the other intersection point ($1108_1$) will not lie on the edge of the primitive 1102 and will not be useful for determining which of the tiles the primitive 1102 is in.

In step S1014 the tiling unit 108 determines which of the initial intersection points are to be used as intersection points of the tile boundary 1104 with the edge of the primitive 1102 by identifying which of the initial intersection points lie on the edge of the primitive 1102. This can be done by considering progressing along the tile boundary 1104 and for points either side of an initial intersection point (e.g. immediately either side of the initial intersection point) determining whether the points are inside or outside of the primitive 1102. If the determination is different for the two points either side of an initial intersection point then the initial intersection point is an intersection point on the edge of the primitive (e.g. points $1108_2$ and $1108_3$), whereas if the determination is the same for the two points either side of an initial intersection point then the initial intersection point is not an intersection point on the edge of the primitive (e.g. point $1108_1$). Therefore in the example shown in FIG. 11a intersection points $1108_2$ and $1108_3$ are identified as being on the edge of the primitive 1102, and these identified intersection points are used to determine which of the tiles in the first column of the bounding box the primitive is in. The identified intersection points can be stored in the store 114 for use in a subsequent iteration to process a subsequent column, as is apparent in the description provided below. It could be the sample position of the intersection point which is stored or simply the tile in which the intersection point occurs. The method then passes from step S1014 to both steps S1016 and S1018.

In step S1016 the tiling unit 108 determines a start tile $1112_s$ in the column of tiles. This is done by finding the first tile in the column (e.g. starting from the top of the bounding box and working downwards) which includes one of the determined intersection points identified in step S1014 (either $1108_2$ or $1108_3$) on its boundary or which includes a vertex of the primitive 1102. Tile $1112_e$ is determined to be the start tile because it has the intersection point $1108_2$ on its boundary. In step S1018 the tiling unit 108 determines an end tile $1112_e$ in the column of tiles. This is done by finding the last tile in the column (e.g. starting from the top of the bounding box and working downwards) which includes one of the determined intersection points identified in step S1014 (either $1108_2$ or $1108_3$) on its boundary or which includes a vertex of the primitive 1102. Tile $1112_e$ is determined to be the end tile because it has the intersection point $1108_3$ on its boundary and it also has the vertex 1110.

In step S1020 the tiling unit 108 determines that the primitive is in the tiles in the column between, and including, the start tile $1112_s$ and the end tile $1112_e$. These tiles of the first column between and including the start and end tiles ($1112_s$ and $1112_e$) are shown with hatching, and it can be seen that the primitive 1102 is in the hatched tiles but not in the other tiles of the first column of the bounding box.

In step 1022, the primitive identifier for primitive 1102 is added to the display lists for those tiles for which it is determined that the primitive is in those tiles (e.g. the hatched tiles shown in FIG. 11a).

In step S1024 the tiling unit 108 determines whether there are more lines (columns in this example) of tiles to process in the bounding box. If there are, then the method passes to step S1026 so that the next line (e.g. column) can be processed. In step S1026 the tiling unit 108 determines whether the next line is the last line of the bounding box. If the next line is not the last line in the bounding box then the method passes from step S1026 to step S1012 so that the next line can be processed.

Figure 11B:
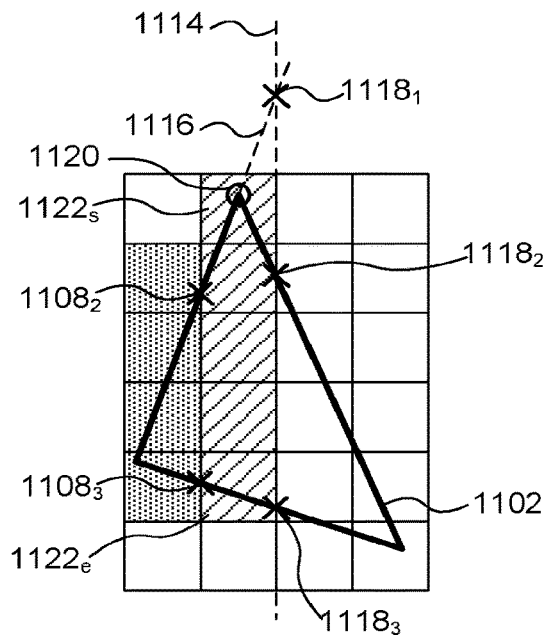

For example, in the example shown in FIG. 11b, the second column of tiles can be processed. In this way, the tile boundary 1114 between the second and third columns of tiles is used to determine the initial intersection points $1118_1$, $1118_2$ and $1118_3$ (in step S1012). The initial intersection point $1118_1$ is at the point where the edge line 1116 crosses the tile boundary 1114, but this initial intersection point $1118_1$ is not on the edge of the primitive 1102. However, the other initial intersection points $1118_2$ and $1118_3$ are on the edge of the primitive 1102, so in step S1014 the initial intersection points $1118_2$ and $1118_3$ (but not $1118_1$) are identified as being intersection points which lie on the edge of the primitive. These identified intersection points can be stored for use in a subsequent iteration.

To find the start and end tiles of the second column, the locations of the intersection points $1108_2$ and $1108_3$ (which were determined in the previous iteration and stored for use in this iteration), the locations of the intersection points $1118_2$ and $1118_3$ and the location of the vertex 1020 are used. The start tile is determined to be tile $1122_s$ (in step S1016) because this tile includes the vertex 1120. The end tile is determined to be tile $1122_e$ (in step S1018) because this tile includes the intersection points $1108_3$ and $1118_3$. The tiles shown with hatching in FIG. 11b are determined to be in the primitive 1102 in step S1020 because they are between (and including) the start and end tiles $1122_s$ and $1122_e$. Therefore the primitive identifier for primitive 1102 is added to the display lists for the tiles shown with hatching in FIG. 11b (in step S1022).

Figure 11C:
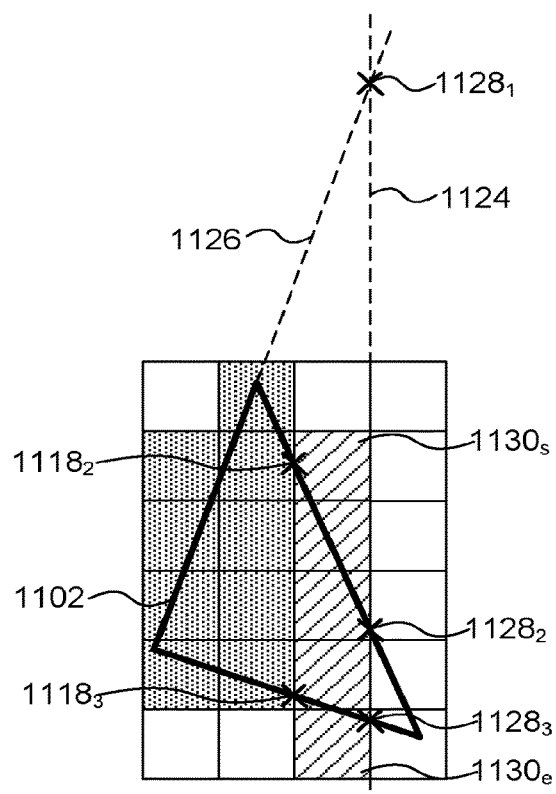

The method repeats for the next column (the third column), as shown in FIG. 11c. Since the third column is not the last column in the bounding box the method repeats back to step S1012 and the third column is processed. In this way, the tile boundary 1124 between the third and fourth columns of tiles is used to determine the initial intersection points $1128_1$, $1128_2$ and $1128_3$ (in step S1012). The initial intersection point $1128_1$ is at the point where the edge line 1126 crosses the tile boundary 1124, but this initial intersection point $1128_1$ is not on the edge of the primitive 1102. However, the other initial intersection points $1128_2$ and $1128_3$ are on the edge of the primitive 1102, so in step S1014 the initial intersection points $1128_2$ and $1128_3$ (but not $1128_1$) are identified as being intersection points which lie on the edge of the primitive. These identified intersection points can be stored for use in a subsequent iteration.

To find the start and end tiles of the third column, the locations of the intersection points $1118_2$ and $1118_3$ (which were determined in the previous iteration and stored for use in this iteration) and the locations of the intersection points $1128_2$ and $1128_3$ are used. The start tile is determined to be tile $1130_s$ (in step S1016) because this tile includes the intersection point $1118_2$. The end tile is determined to be tile $1130_e$ (in step S1018) because this tile includes the intersection point $1128_3$. The tiles shown with hatching in FIG.

11c are determined to be in the primitive 1102 in step S1020 because they are between (and including) the start and end tiles $1130_s$ and $1130_e$. Therefore the primitive identifier for primitive 1102 is added to the display lists for the tiles shown with hatching in FIG. 11c (in step S1022).

Figure 11D:
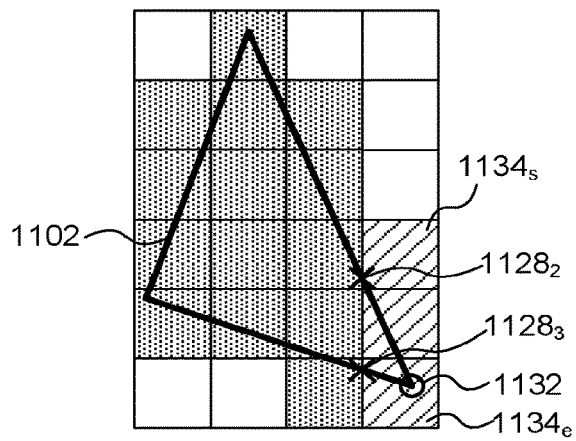

The method repeats for the next column (the fourth column), as shown in FIG. 11d. Since the fourth column is the last column in the bounding box the method passes from step S1026 to steps S1016 and S1018 without performing steps S1012 or S1014. This is because the tile boundary to the right of the last column in the bounding box is the edge of the bounding box so the primitive will not cross this tile boundary. To find the start and end tiles of the last column, the locations of the intersection points $1128_2$ and $1128_3$ (which were determined in the previous iteration and stored for use in this iteration) and the location of the vertex 1032 are used. The start tile is determined to be tile $1134_s$ (in step S1016) because this tile includes the intersection point $1128_2$. The end tile is determined to be tile $1134_e$ (in step S1018) because this tile includes the intersection point $1128_3$ and the vertex 1032. The tiles shown with hatching in FIG. 11d are determined to be in the primitive 1102 in step S1020 because they are between (and including) the start and end tiles $1134_s$ and $1134_e$. Therefore the primitive identifier for primitive 1102 is added to the display lists for the tiles shown with hatching in FIG. 11d (in step S1022).

Then in step S1024 it is determined that there are no more columns of tiles to process in the bounding box so the method passes to step S1028. In step S1028 the display lists for the tiles are output from the tiling unit 108 and stored in the memory $104_1$. As described above, in examples described herein, whilst the display lists are being created they may be stored in the store 114 which is internal to the tiling unit 108. In some examples, once all of the primitives for a render have been tiled then the display lists are complete and they are passed to the off-chip memory $104_1$ for storage therein. As described above, in other examples, the tiling unit 108 might not use an internal store (such as store 114) to store display lists, and instead primitive identifiers may be written directly to display lists in memory $104_1$ as tiling is performed. Furthermore, in some further examples, the internal store 114 may be implemented in the tiling unit 108, but the internal store 114 might not be big enough to store all of the display lists for all of the tiles at once. Therefore, the internal store 114 may be used to gather tiling results that can then be written out to memory $104_1$ in chunks (or "batches") as the tiling is performed. This can avoid inefficient memory access patterns when primitives are written to different display lists in memory $104_1$.

The rendering unit 110 can then render the primitives in each of the tiles in accordance with the display lists. In order to render the primitives for a tile, in step S1030 the rendering unit 110 retrieves the display list from the memory $104_1$ for the tile. The rendering unit 110 can then retrieve the primitives indicated by the display list as being in the tile currently being rendered. These primitives may be retrieved from the memory $104_1$. The rendering unit 110 then renders the primitives in the tile. In the example shown in FIG. 1, the rendering unit 110 implements deferred rendering whereby hidden surface removal is performed before texturing and/or shading, but in other examples non-deferred rendering may be implemented. In step S1032 the rendered result is output and can be passed to the memory $104_2$ for storage, e.g. in a frame buffer. The rendering unit 110 processes primitives in each of the tiles and when the whole image has been rendered and stored in the memory $104_2$, the image can be outputted from the graphics processing system 100 and, for example, displayed on a display.

In some situations, e.g. for primitives with large bounding boxes, the method described with reference to FIGS. 10 and 11a to 11d may provide a more efficient way of tiling a primitive compared to the examples described with reference to FIGS. 4 to 9. In contrast, in other situations, e.g. for primitives with small bounding boxes, the methods described with reference to FIGS. 4 to 9 may provide a more efficient way of tiling a primitive compared to the examples described with reference to FIGS. 10 and 11a to 11d. In particular, the number of calculations performed in the method described with reference to FIGS. 10 and 11a to 11d is linearly proportional to the minimum dimension of the bounding box (e.g. linearly proportional to the minimum of the number of columns of tiles and the number of rows of tiles in the bounding box). This is because for each of the lines (e.g. columns of tiles) except for the last line, the same number of calculations are performed irrespective of how many tiles are in each line. For the last line fewer calculations may be performed, as is apparent from the description above. For example, the same calculations would be performed for a bounding box including a 20×4 group of tiles (i.e. 20 rows and 4 columns) as would be performed in the example shown in FIGS. 11a to 11d for a bounding box including a 6×4 group of tiles (i.e. 6 rows and 4 columns). This is in contrast to the approaches described with reference to FIGS. 4 to 9 in which the number of calculations performed for tiling is approximately proportional to the number of tiles in the bounding box, e.g. approximately proportional to the area of the bounding box, which scales approximately with the minimum dimension of the bounding box squared. Therefore, the method described with reference to FIGS. 10 and 11a to 11d is particularly useful for processing primitives with large bounding boxes, and in particular for processing primitives with bounding boxes which are significantly longer in one dimension than in the other dimension.

Therefore, in some embodiments, the tiling unit 108 may be capable of implementing the tiling method in two different ways: (i) method 1, i.e. as described with reference to the flow chart shown in FIGS. 4a and 4b, and (ii) method 2, i.e. as described with reference to the flow chart shown in FIG. 10. The first two steps of the method are the same, i.e. the tiling unit receives the primitives and determines a bounding box for a primitive. The tiling unit 108 may then analyse the bounding box to determine whether to perform method 1 or method 2. For example, if the maximum dimension of the bounding box is above a threshold number of tiles then the tiling unit 108 may proceed with method 2, whereas if the maximum dimension of the bounding box is not above the threshold number of tiles then the tiling unit 108 may proceed with method 1. Other ways of selecting between method 1 and method 2 may be used in different examples, e.g. based on the area of the bounding box. In this manner, the way in which the primitives are tiled can be different for different primitives, and in particular can be selected to be well suited to the size and/or shape of the primitive to thereby provide efficient tiling of the primitives.

The method steps of the flow charts shown in FIGS. 4a, 4b and 10 may be implemented as logic blocks within the processing logic 112 of the tiling unit 108. The logic blocks may be implemented in hardware or software or a combination thereof. For example, if the logic blocks are implemented in hardware they may be formed as particular arrangements of transistors and other hardware components suited for performing the desired functions of the logic blocks as described herein. In contrast, if the logic blocks are implemented in software they may comprise sets of computer instructions which can be stored in a memory and can be provided to the processing logic 112 for execution thereon to thereby provide the functionality of the logic blocks.

Figure 12:
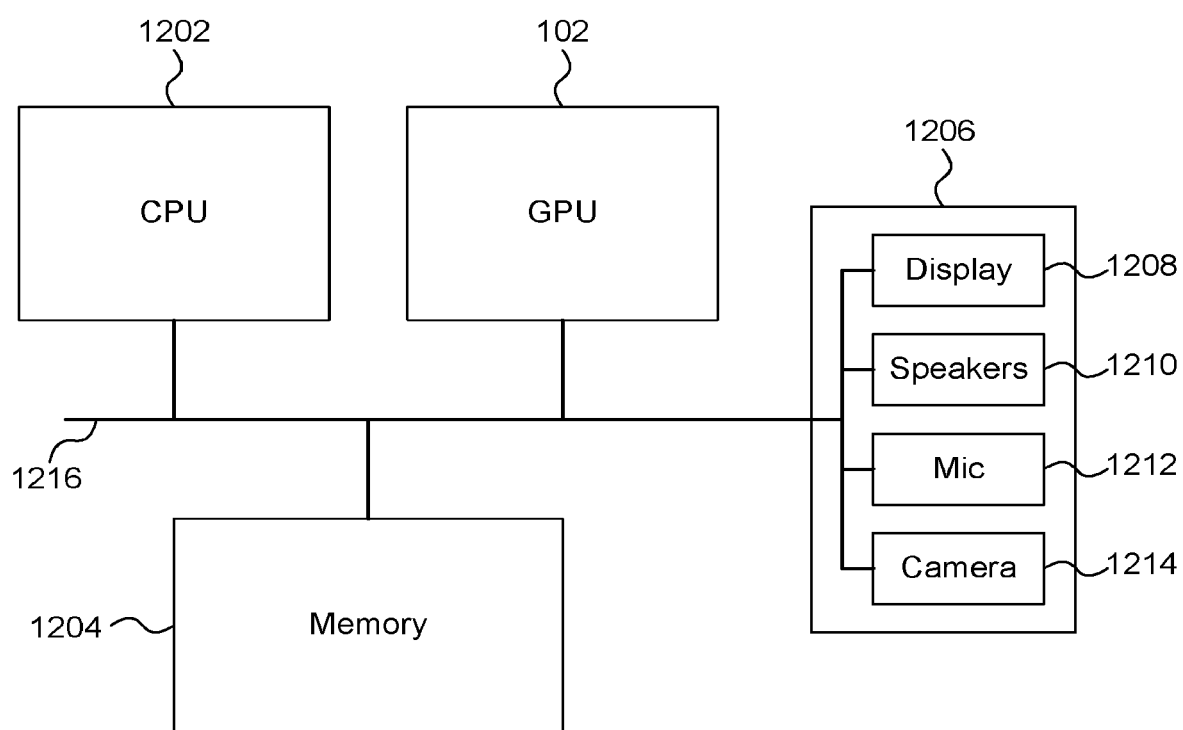
FIG. 12 is a schematic diagram of a computer system.

The graphics processing system 100 described above can be implemented in a computer system. For example, FIG. 12 shows a computer system which comprises the GPU 102, a CPU 1202 and a memory 1204, wherein the memory 1204 may include memory blocks corresponding to memories $104_1$ and $104_2$ described above. The computer system also comprises other devices 1206, such as a display 1208, speakers 1210, a microphone 1212 and a camera 1214. The components of the computer system can communicate with each other via a communications bus 1216. Computer program code for an application may be stored in the memory 1204, and may for example be executed on the CPU 1202. If the application needs to render an image of a 3D scene, the graphics data describing the primitives can be sent to the GPU 102, and the GPU 102 can render the scene as described above. Generally, any of the functions, methods, techniques or components described above (e.g. the tiling unit 108 and its components) can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation, the module, functionality, component, unit or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component, unit or logic (e.g. the logic blocks implemented within the processing logic 112 of the tiling unit 108) may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, unit or logic (e.g. the logic blocks within the processing logic 112) may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component, unit or logic described above, such as HDL (hardware description language) software, as is used for designing integrated circuits, or for configuring programmable chips, to carry out desired functions. That is, there may be provided a computer readable storage medium having encoded thereon computer readable program code for generating a graphics processing system configured to perform any of the methods described herein, or for generating a graphics processing system comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a graphics processing system, e.g. comprising a tiling unit as described in the examples herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

What is claimed is:

1. A method of processing a primitive in a graphics processing system, the method comprising:

tiling the primitive to determine which of a plurality of tiles of a rendering space the primitive is in, said tiling the primitive comprising using tiling results in respect of the primitive for two or more tiles of a subset of the tiles of the rendering space to infer tiling results used to determine whether or not the primitive is in at least one other tile which: (i) is not one of the tiles of said subset, and (ii) is located within a region whose boundaries are at least partially defined by said two or more of the tiles of the subset; and rendering the primitive in accordance with data indicating which of the tiles of the rendering space the primitive is in.

2. The method of claim 1 further comprising performing, for each tile of the subset of the tiles of the rendering space, a tiling test to determine whether or not the primitive is in the tile.

3. The method of claim 2 wherein, for each of one or more of the tiles of the subset, said performing a tiling test comprises performing tiling calculations to determine whether or not the primitive is in the tile.

4. The method of claim 3 wherein said performing tiling calculations for a tile comprises, for an edge of the primitive, using an edge equation describing the edge of the primitive to determine whether an edge-specific test point in the tile is inside or outside of the edge, wherein the primitive is determined to be outside of the tile if it is determined, for any of the edges, that the respective edge-specific test point is outside of the edge.

5. The method of claim 4 wherein the edge-specific test point in a tile for an edge is the point in the tile which is the most likely to be inside the edge in accordance with the orientation of the edge.

6. The method of claim 2 wherein, for each of one or more of the tiles of the subset, said performing a tiling test comprises determining that the primitive has one or more vertices within the tile.

7. The method of claim 2 wherein the subset of tiles includes a respective tile from each of a plurality of N×M blocks of tiles of the rendering space, wherein N and M are integers, and wherein said tiling the primitive is implemented in a hierarchical manner such that the steps of performing tiling tests for a subset of tiles and using the results of the tiling tests to determine whether or not the primitive is in at least one other tile are performed a first time at a relatively coarse resolution with the subset of tiles including a respective tile from each of a plurality of $N_1 \times M_1$ blocks of tiles of the rendering space, and then performed a second time at a relatively fine resolution with the subset of tiles including a respective tile from each of a plurality of $N_2 \times M_2$ blocks of tiles of the rendering space, wherein $N_1 > N_2$ and/or $M_1 > M_2$.

8. The method of claim 1 wherein said tiling the primitive further comprises:
determining a bounding box for the primitive, wherein the subset of tiles does not include tiles which do not at least partially overlap with the bounding box.

9. The method of claim 8 wherein the bounding box is clipped so that it does not extend beyond the edges of the rendering space.

10. The method of claim 8 wherein the subset of tiles includes the corner tiles which are in the corners of the bounding box, and wherein if the results of the tiling tests for the subset of tiles indicate that the primitive is in all of the corner tiles of the bounding box then those results are used to determine that the primitive is in all of the tiles of the bounding box.

11. The method of claim 1 wherein the subset of tiles includes a respective tile from each of a plurality of N×M blocks of tiles of the rendering space, wherein N and M are integers.

12. The method of claim 11 wherein N=M=2.

13. The method of claim 1 wherein said two or more of the tiles of the subset comprises:
two tiles in the same row or column of tiles of the rendering space; or
four tiles arranged in a rectangle within the rendering space.

14. The method of claim 1 further comprising including a primitive identifier of the primitive in a display list for a particular tile if it is determined that the primitive is in the particular tile.

15. The method of claim 14 further comprising, for each of the tiles of the rendering space, rendering the primitives in the tile in accordance with the display list for the tile.

16. A graphics processing system comprising:
a tiling unit for tiling a primitive to determine which of a plurality of tiles of a rendering space the primitive is in, the tiling unit being configured to use tiling results in respect of the primitive for two or more tiles of a subset of tiles of the rendering space to infer tiling results used to determine whether or not the primitive is in at least one other tile which: (i) is not one of the tiles of said subset, and (ii) is located within a region whose boundaries are at least partially defined by said two or more of the tiles of the subset; and
a rendering unit configured to render the primitive in accordance with data indicating which of the tiles of the rendering space the primitive is in.

17. The graphics processing system of claim 16 wherein the tiling unit is further configured to perform, for each tile of the subset of the tiles of the rendering space, a tiling test to determine whether or not the primitive is in the tile.

18. The graphics processing system of claim 16 wherein the tiling unit is configured to perform a respective tiling test for each of one or more of the tiles of the subset by performing tiling calculations to determine whether or not the primitive is in the tile; and
wherein the tiling unit is configured to perform the tiling calculations for a tile by, for an edge of the primitive, using an edge equation describing the edge of the primitive to determine whether an edge-specific test point in the tile is inside or outside of the edge, wherein the primitive is determined to be outside of the tile if it is determined, for any of the edges, that the respective edge-specific test point is outside of the edge.

19. The graphics processing system of claim 16 wherein the subset of tiles includes a respective tile from each of a plurality of N×M blocks of tiles of the rendering space, wherein N and M are integers.

20. A non-transitory computer readable storage medium having stored thereon a computer readable dataset description that, when processed in an integrated circuit manufacturing system, causes the integrated circuit manufacturing system to generate a graphics processing system comprising:
a tiling unit for tiling a primitive to determine which of a plurality of tiles of a rendering space the primitive is in, the tiling unit being configured to use tiling results in respect of the primitive for two or more tiles of a subset of tiles of the rendering space to infer tiling results used to determine whether or not the primitive is in at least one other tile which: (i) is not one of the tiles of said subset, and (ii) is located within a region whose boundaries are at least partially defined by said two or more of the tiles of the subset; and a rendering unit configured to render the primitive in accordance with data indicating which of the tiles of the rendering space the primitive is in.

* * * * *